(12) United States Patent
Chau et al.

(10) Patent No.: US 11,255,740 B2
(45) Date of Patent: Feb. 22, 2022

(54) PRESSURE GAUGE CHIP AND MANUFACTURING PROCESS THEREOF

(71) Applicant: Chinese Academy of Sciences Institute of Geology and Geophysics, Beijing (CN)

(72) Inventors: Kevin Chau, Beijing (CN); Man Wong, Hong Kong (CN)

(73) Assignee: Chinese Academy of Sciences Institute of Geology and Geophysics, Beijing (CN)

( * ) Notice: Subject to any disclaimer, the term of this patent is extended or adjusted under 35 U.S.C. 154(b) by 240 days.

(21) Appl. No.: 16/073,732

(22) PCT Filed: Feb. 28, 2017

(86) PCT No.: PCT/CN2017/000198
§ 371 (c)(1),
(2) Date: Dec. 26, 2018

(87) PCT Pub. No.: WO2017/148215
PCT Pub. Date: Sep. 8, 2017

(65) Prior Publication Data
US 2019/0113411 A1   Apr. 18, 2019

(30) Foreign Application Priority Data
Mar. 4, 2016  (CN) .......................... 201610124330.0

(51) Int. Cl.
*G01L 9/06* (2006.01)
*G01L 9/00* (2006.01)
(Continued)

(52) U.S. Cl.
CPC .......... *G01L 9/0052* (2013.01); *E21B 47/017* (2020.05); *E21B 47/06* (2013.01); *G01L 9/0048* (2013.01); *G01L 9/06* (2013.01)

(58) Field of Classification Search
None
See application file for complete search history.

(56) References Cited

U.S. PATENT DOCUMENTS 3,617,780 A   11/1971   Benjaminson et al.
5,024,098 A   6/1991   Petitjean et al.
(Continued)

FOREIGN PATENT DOCUMENTS

CN   101271028 A   9/2008
CN   102359836 A   2/2012
(Continued)

OTHER PUBLICATIONS

Y. Kanda, "A Graphical Representation of the Piezoresistance Coefficients in Silicon." IEEE Transactions on Electron Devices, vol. ED-29, No. 1, pp. 64-70, Jan. 1982.

*Primary Examiner* — Xiaoming Liu
(74) *Attorney, Agent, or Firm* — Edwin A. Sisson, Attorney at Law, LLC; Jeffrey J. Banyas

(57) ABSTRACT

The present invention is related to a sensor. In particular, the present invention is related to a pressure sensor die and its fabrication process. The pressure sensor comprises a chamber inside which a pressure sensor die is provided. The pressure sensor die is uniformly compressed by the external pressure to be measured and can deform freely inside the chamber. The pressure sensor die is primarily constructed of single crystalline silicon and comprises a substrate and a cap connected together. A recess is formed on the cap. The recess forms a sealed cavity with the substrate. A silicon oxide layer is formed between the substrate and the cap. The substrate further comprises a plurality of piezoresistive sensing elements which are located inside the sealed cavity. The present pressure sensor is more immune to temperature effects. It is especially suitable for operating in a high (Continued)

temperature, high pressure environment and is capable of delivering accurate and reliable pressure measurements at low cost.

17 Claims, 18 Drawing Sheets

(51) Int. Cl.
*E21B 47/017* (2012.01)
*E21B 47/06* (2012.01)

(56) References Cited

U.S. PATENT DOCUMENTS

| | | | |
|---|---|---|---|
| 8,109,149 B2 | 2/2012 | Kotovsky | |
| 2003/0217603 A1* | 11/2003 | Ishio | G01L 9/0054 |
| | | | 73/754 |
| 2007/0151356 A1* | 7/2007 | Sumigawa | G01B 7/18 |
| | | | 73/777 |
| 2012/0205653 A1* | 8/2012 | Nishikage | G01L 9/0054 |
| | | | 257/49 |
| 2017/0131169 A1* | 5/2017 | Takimoto | G01L 19/0645 |
| 2018/0024014 A1* | 1/2018 | Taguchi | G01L 1/2243 |
| | | | 73/862.628 |

FOREIGN PATENT DOCUMENTS

| | | |
|---|---|---|
| CN | 105203234 A | 12/2015 |
| CN | 105241600 A | 1/2016 |
| CN | 105784214 A | 7/2016 |

* cited by examiner

Step 1

Step 2

Step 3

Step 4

Step 5

Step 6

Step 7

Step 1

Step 2

Step 3

Step 4

Step 5

Step 6

Step 7

PRESSURE GAUGE CHIP AND MANUFACTURING PROCESS THEREOF

TECHNICAL FIELD

The present invention is related to a sensor. In particular, the present invention relates to a pressure sensor for downhole pressure measurements.

BACKGROUND OF THE INVENTION

Downhole pressure measurements are essential when drilling for hydrocarbon recovery. During the drilling process, geological pressure data are collected to tailor drilling parameters and the construction of the well. After the well is drilled and production starts, pressure is continuously monitored for reservoir management. Accurate measurement of pressure is therefore the key to optimize recovery and reduce risk throughout the entire life of a hydrocarbon well. Thus, we need an accurate and cost-effective pressure sensor for downhole measurements.

Pressure sensors usable in hydrocarbon wells must be able to withstand harsh conditions and remain accurate, stable and reliable for weeks during a measurement period. In particular, such sensors must be able to withstand temperature ranging from −50° C. to 250° C. and pressure up to 200 MPa (around 2000 atmospheres) while maintaining an accuracy of better than 0.1%, and desirably 0.01%, of the full-scale pressure.

Two types of pressure sensors are commonly used for downhole applications. The first type is the resonant quartz pressure sensor. In U.S. Pat. No. 3,617,780, one example of resonant quartz pressure sensor is described wherein a crystalline quartz cylinder closed at both ends is immersed in a fluid which communicates with the external pressure to be measured via an isolation diaphragm or a bellow. A crystalline quartz plate spans across the vacuum sealed cavity inside the cylinder. The plate resonance is excited and detected via the piezoelectric effect. The plate resonant frequency, which varies with the hydrostatic pressure on the cylinder wall, is a measure of the external pressure. Constructed almost entirely out of crystalline quartz and being a mature technology, resonant quartz pressure sensors have achieved the highest benchmark for accuracy, stability and reliability for downhole pressure measurements to date. However, they tend to be very expensive.

The second type of downhole pressure sensors is based on sapphire. In U.S. Pat. No. 5,024,098, a sapphire pressure sensor is described wherein a sapphire cell is immersed in a fluid which communicates with the external pressure to be measured via an isolation diaphragm. The cell deforms under pressure and the resulting strains are measured by strain gauge elements disposed on a planar surface of the sapphire cell. While reliable and rugged for downhole applications, sapphire pressure sensors are in general not as stable and accurate as resonant quartz pressure sensors and they are also quite expensive. In case silicon strain gauge elements are employed, accuracy and stability could be affected by the excessive temperature coefficient of resistance and the temperature coefficient of piezoresistance effect in silicon. On the other hand, if non-silicon strain gauge elements, for example, metallic alloys, are used their low gauge factor and therefore low sensitivity can result in the undesirable amplification of temperature and other measurement errors. In any case, the mismatch in the thermal expansion coefficients between sapphire and the strain gauge material creates further temperature errors.

The majority of sensors in use today are of the micro-electro-mechanical system (MEMS) type. MEMS based sensors are typically realized with silicon micromachining that originated from integrated circuit fabrication and still shares many of its processing technologies. In addition, there are a few unique processes specifically tailored toward the fabrication of 3-dimensional microstructures. These include double-side photolithography, deep reactive ion etching (DRIE), and wafer bonding to name a few. Silicon has superb mechanical properties compared with quartz and sapphire, for example, high hardness, high modulus of elasticity, high ultimate strength, and is perfectly elastic up to the fracture point. Moreover, single crystalline silicon is highly piezoresistive, which is therefore effective in converting changes in mechanical strain into changes in electrical resistance. Furthermore, precision microstructures are much easier to fabricate in silicon than in quartz or sapphire. With demonstrated advantages that include low cost, small size, high accuracy, high reliability, and high stability, silicon MEMS piezoresistive pressure sensors have become the dominant type of pressure sensors in use for automotive, medical, industrial and consumer electronics applications.

Despite their huge success, MEMS pressure sensors have not been widely adopted for downhole applications. There are a few problems that must be overcome. In particular, an improved mechanical design over the conventional diaphragm-type silicon pressure sensors is required to handle the very high pressure. This is because in a conventional diaphragm-type silicon pressure sensor die, the silicon thin diaphragm serves the purpose of amplifying pressure into stress. In order to measure high pressure up to 200 MPa, the lateral dimensions and thickness of the diaphragm must be respectively narrowed down and thickened accordingly. However, if the lateral dimensions of the diaphragm are made too narrow, there will not be enough room on the diaphragm to place the piezoresistive sensing elements. Else if the diaphragm is thickened substantially, it will lead to non-ideal deformation of the entire pressure sensor die. Furthermore, there needs to be a better means in MEMS pressure sensors to overcome the various temperature coefficients and instabilities so as to improve the measurement accuracy at high temperature. Accordingly, a need presently exists for an improved silicon pressure sensor that is highly accurate, cost effective, and suitable for operating in a high temperature, high pressure downhole environment.

SUMMARY OF THE INVENTION

The objective of the present invention is to overcome current technological shortcomings so as to provide a pressure sensor that is highly accurate, having a wide pressure range, less affected by the environment, and capable of operating in a high temperature, high pressure downhole environment.

A pressure sensor comprising:

a chamber and a pressure sensor die provided within said chamber, said pressure sensor die is uniformly compressed by the external pressure to be measured and can deform freely inside the chamber; said pressure sensor die is constructed of single crystalline silicon and comprises a substrate and a cap connected together;

wherein a recess is formed on said cap; said recess and said substrate form a sealed cavity; a silicon oxide layer is formed between said substrate and said cap;

said substrate further comprises a plurality of piezoresistive sensing elements; said piezoresistive sensing elements are located inside said sealed cavity.

The pressure sensor in the present invention also comprises the following optional features:

Said cavity is a vacuum sealed cavity.

A metal contact is provided at the terminals of said piezoresistive sensing element.

Said substrate comprises at least two sets of piezoresistive sensing elements; said two sets of piezoresistive sensing elements are perpendicular to each other.

Said piezoresistive sensing elements are electrically connected in a Wheatstone bridge configuration.

Said substrate is formed on a {110} crystallographic plane of p-type silicon; said piezoresistive sensing elements are formed on n-type doped regions of said substrate and oriented along a <100> or <110> crystallographic direction.

Said substrate is formed on a {110} crystallographic plane of n-type silicon; said piezoresistive sensing elements are formed on p-type doped regions of said substrate and oriented along a <100> or <110> crystallographic direction.

Said cap and said substrate are both cuboids; said cap is formed on a {110} crystallographic plane of single crystalline silicon; and on the bonded plane between said cap and said substrate, the corresponding edges of said cap and said substrate are oriented along the same crystallographic direction.

Said substrate of said pressure sensor die uses a silicon-on-insulator (SOI) construction; said silicon-on-insulator construction comprises a handle layer, a device layer, and a buried silicon oxide layer formed between said handle layer and device layer; said piezoresistive sensing elements are formed on said device layer.

A silicon oxide insulating layer is formed on the top, the bottom and along the sides of said piezoresistive sensing element.

Said device layer is formed on a {110} crystallographic plane of p-type silicon; said piezoresistive sensing elements are formed on said p-type silicon of said device layer and oriented along a <110> or <110> crystallographic direction.

Said device layer is formed on a {110} crystallographic plane of n-type silicon; said piezoresistive sensing elements are formed on said n-type silicon of said device layer and oriented along a <110> or <110> crystallographic direction.

Said handle layer is formed on a {110} crystallographic plane of single crystalline silicon; and the corresponding edges of said handle layer and said device layer are oriented along the same crystallographic direction.

Said cap is formed on a {110} crystallographic plane of single crystalline silicon; and the corresponding edges of said cap and said device layer are oriented along the same crystallographic direction.

Said chamber is an enclosure within a metal housing; said chamber is filled with an electrically insulating fluid; and said pressure sensor die is immersed in said electrically insulating fluid.

A metal diaphragm is further provided; said metal diaphragm seals said electrically insulating fluid and said pressure sensor die in said chamber.

External pressure to be measured is transmitted from said metal diaphragm to said pressure sensor die.

The first fabrication process for said pressure sensor die comprising the following steps:

Step 1, grow or deposit a silicon oxide layer on the top surface and the bottom surface of a single crystalline silicon wafer;

Step 2, using photolithography and ion implantation, dope selective regions on the top surface of said single crystalline silicon wafer, thus forming a plurality of piezoresistive sensing elements of the opposite dopant type to said single crystalline silicon wafer;

Step 3, using photolithography and ion implantation, highly dope selective regions on the top surface of said single crystalline silicon wafer, thus forming highly conductive regions of the opposite dopant type to said single crystalline silicon wafer;

Step 4, using photolithography and ion implantation, highly dope selective regions on the top surface of said single crystalline silicon wafer, thus forming highly conductive regions of the same dopant type as said single crystalline silicon wafer; afterward grow or deposit a silicon oxide layer on the top surface and the bottom surface of said single crystalline silicon wafer and activate all said implanted dopant species;

Step 5, using photolithography and etching, etch contact holes through said silicon oxide layer over said highly conductive regions reaching said highly doped regions; then use metal deposition to form metal interconnection patterns from said contact holes;

Step 6, bond a single crystalline silicon cap wafer which was prefabricated with recesses to the top of said single crystalline silicon wafer;

Step 7, using wafer dicing, cut the bonded silicon wafer into individual pressure sensor dice.

The second fabrication process for said pressure sensor die comprising the following steps:

Step 1, grow or deposit a silicon oxide layer on the top surface and the bottom surface of a silicon-on-insulator wafer;

Step 2, using photolithography and ion implantation, highly dope selective regions on the device layer of said silicon-on-insulator wafer, thus forming highly conductive regions of the same dopant type as said device layer;

Step 3, using photolithography and etching, etch trenches through said device layer reaching said buried silicon oxide layer to form said piezoresistive sensing elements;

Step 4, grow or deposit a layer of silicon oxide to fill said trenches and activate said implanted dopant species;

Step 5, using photolithography and etching, etch contact holes through said silicon oxide layer over said highly conductive regions reaching said highly doped regions on said device layer; then use metal deposition to form metal interconnection patterns from said contact holes;

Step 6, bond a single crystalline silicon cap wafer which was prefabricated with recesses to the top of said silicon-on-insulator wafer;

Step 8, using wafer dicing, cut the bonded silicon wafer into individual pressure sensor dice.

The fabrication process for said recesses on said silicon cap wafer comprises photolithography and etching.

Said etching method comprises one kind or a combination of dry and wet etching methods; said dry etching method is selected from one or more of the following methods: deep reactive ion etching, reactive ion etching, or gaseous xenon difluoride etching for silicon; as well as reactive ion etching, plasma etching, or hydrofluoric acid vapor etching for silicon oxide.

Said wet etching method for silicon comprises one kind or a combination of the following etchants: potassium hydroxide, tetramethylammonium hydroxide, or ethylenediamine pyrocatechol.

Said wet etching method for silicon oxide comprises one kind or a combination of the following etchants: hydrofluoric acid or buffered hydrofluoric acid.

Comparing with the two types of downhole pressure sensors mentioned in the prior art, the pressure sensor in the present invention has the following advantages. First of all, the manufacturing cost of a silicon pressure sensor is much lower than that for quartz and sapphire pressure sensors. However, conventional diaphragm-type silicon pressure sensors cannot function in a 200 MPa environment. In contrast, the pressure sensor die in the present invention does not utilize a diaphragm element as in conventional silicon pressure sensors. Instead, the sensor die is acted upon on all of its surfaces (the top, the bottom and the four sides) by the high pressure in the downhole. The resulting internal die stress is directly sensed without the need for mechanical amplification by a silicon diaphragm. This way the present invention overcomes the main difficulty in the mechanical design of diaphragm-type silicon pressure sensors for high pressure applications while retaining the advantages of silicon MEMS pressure sensors.

Secondly, conventional MEMS piezoresistive sensing elements are electrically insulated by reverse biased PN junctions, the leakage current of which increases exponentially with temperature. As the temperature rises above 150° C., the insulation property of the PN junction will fail. On the other hand, in one of the preferred embodiments of the present invention, there is a buried silicon oxide layer between the piezoresistive sensing elements and the handle layer. There is also silicon oxide layer in between each piezoresistive sensing element. Moreover, an oxide layer is grown or deposited on top of the piezoresistive sensing elements. As a result, each piezoresistive sensing element is completely wrapped around by silicon oxide insulation. Using this dielectric isolation scheme, the electrical insulation will operate even at high temperature.

Furthermore, in the present invention, the two perpendicular sets of piezoresistive sensing elements on the pressure sensor die have different pressure responses, hence providing a differential change in electrical resistance. Then by connecting all four piezoresistive sensing elements in a Wheatstone bridge configuration, temperature and other common mode errors are significantly reduced, thereby increasing the accuracy of the present pressure sensor.

Additionally, the internal cavity formed between the substrate and the cap is preferably sealed in vacuum. The critical portions of all the piezoresistive sensing elements are located inside this vacuum sealed cavity where these critical portions of the piezoresistive sensing elements are least susceptible to external interferences, such as local temperature fluctuations, and foreign contaminations, such as dust. The reliability of the present pressure sensor is further improved as a result. Lastly, the entire pressure sensor die primarily uses a silicon construction which not only avoids the problems caused by the mismatch between dislike materials, but also enables the use of MEMS fabrication technologies with much lower manufacturing cost than that for the quartz and sapphire pressure sensors in the prior art.

DETAILED DESCRIPTION

The illustrative embodiments of the present invention will be described in detail with reference to the accompanying drawings. Please note that the scope of the present invention is not limited to these precise embodiments described. Various changes or modifications may be effected therein by one skilled in the art without departing from the scope or spirit of the invention.

Figure 1:
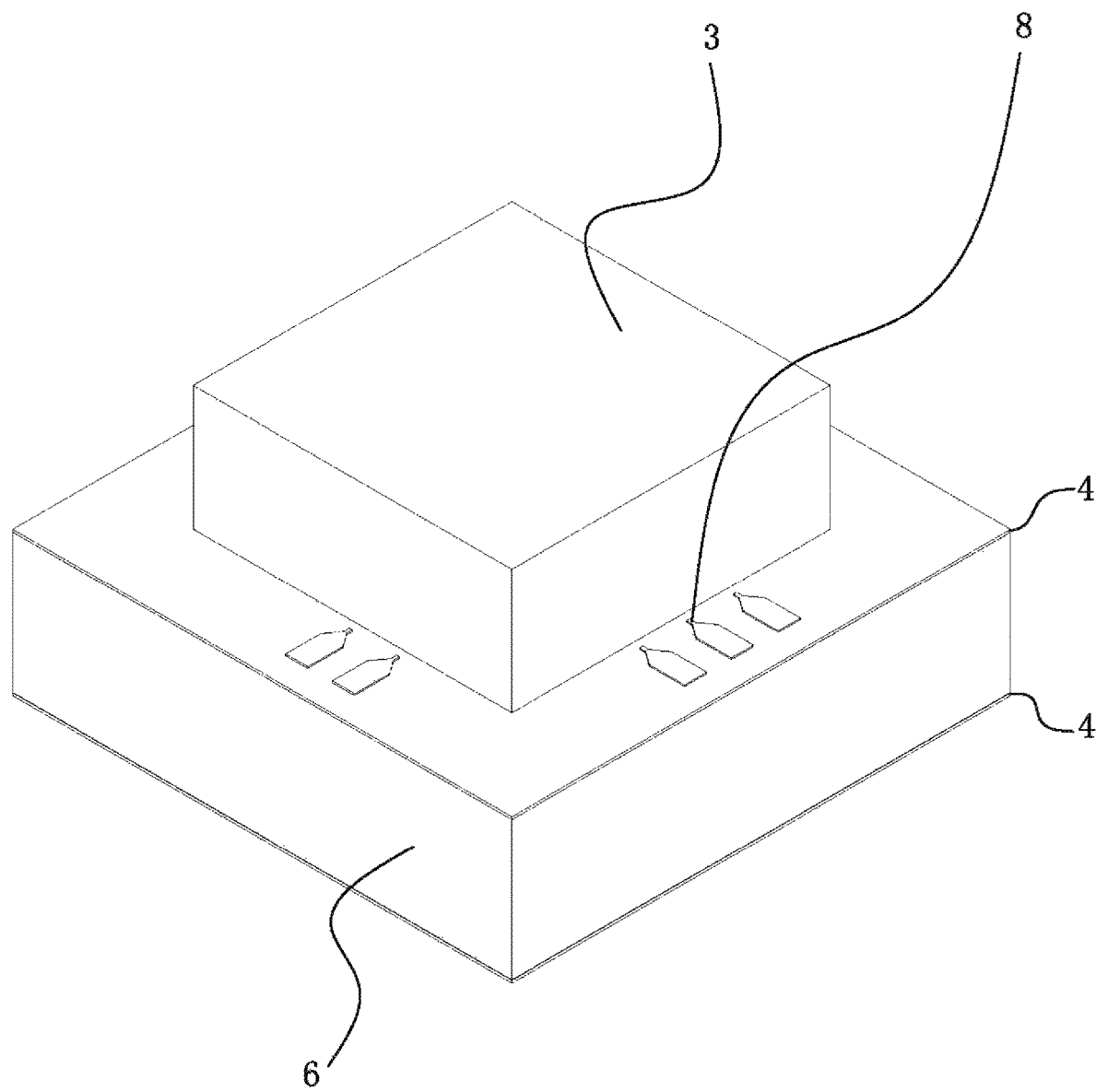
FIG. 1 is a perspective view of the pressure sensor die in the first embodiment of this invention.
Figure 2:
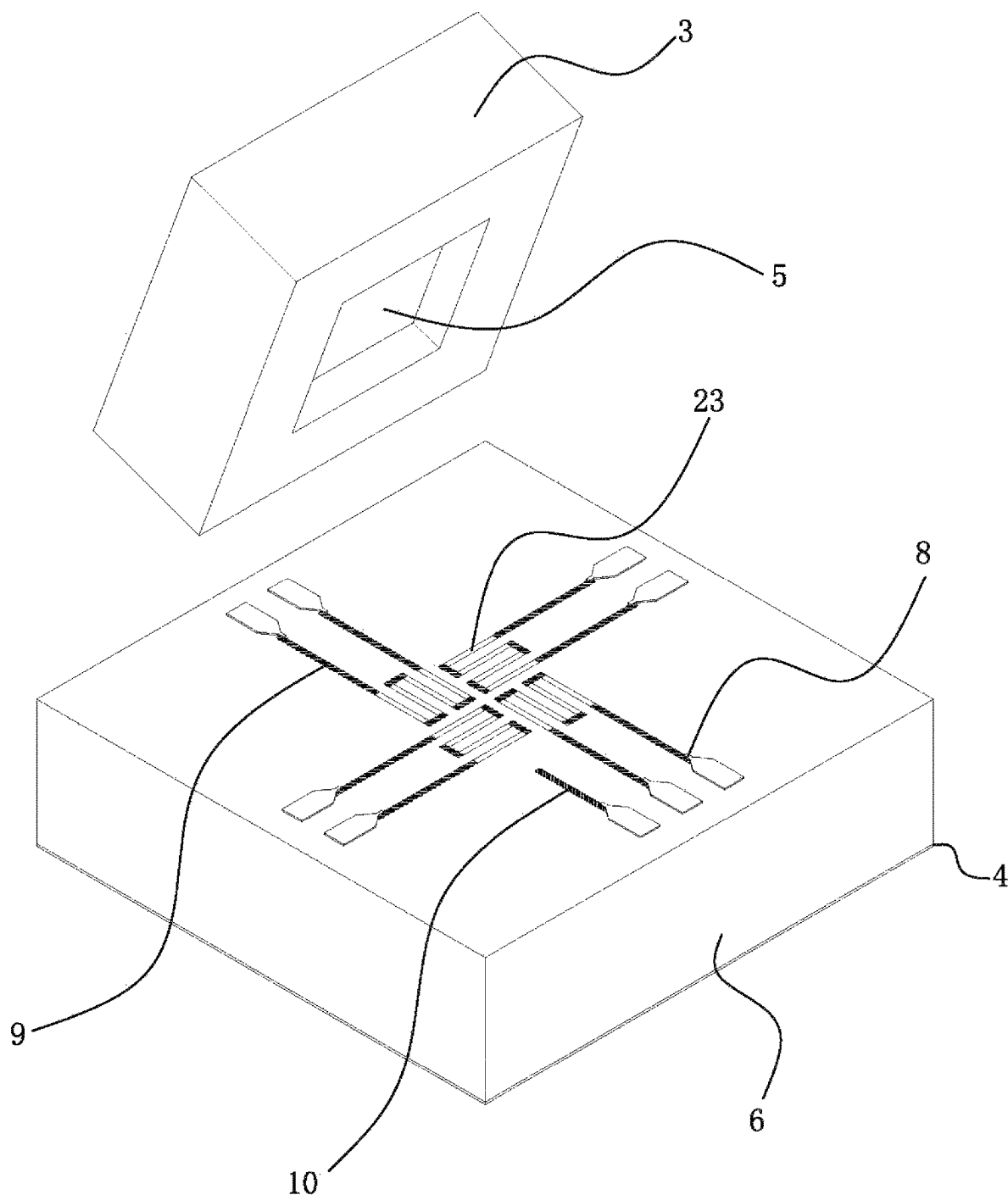
FIG. 2 is a perspective view of the pressure sensor die of FIG. 1 further with the cap detached revealing a recess underneath and further with the top silicon oxide layer removed revealing various features on the substrate in the first embodiment of this invention.
Figure 3:
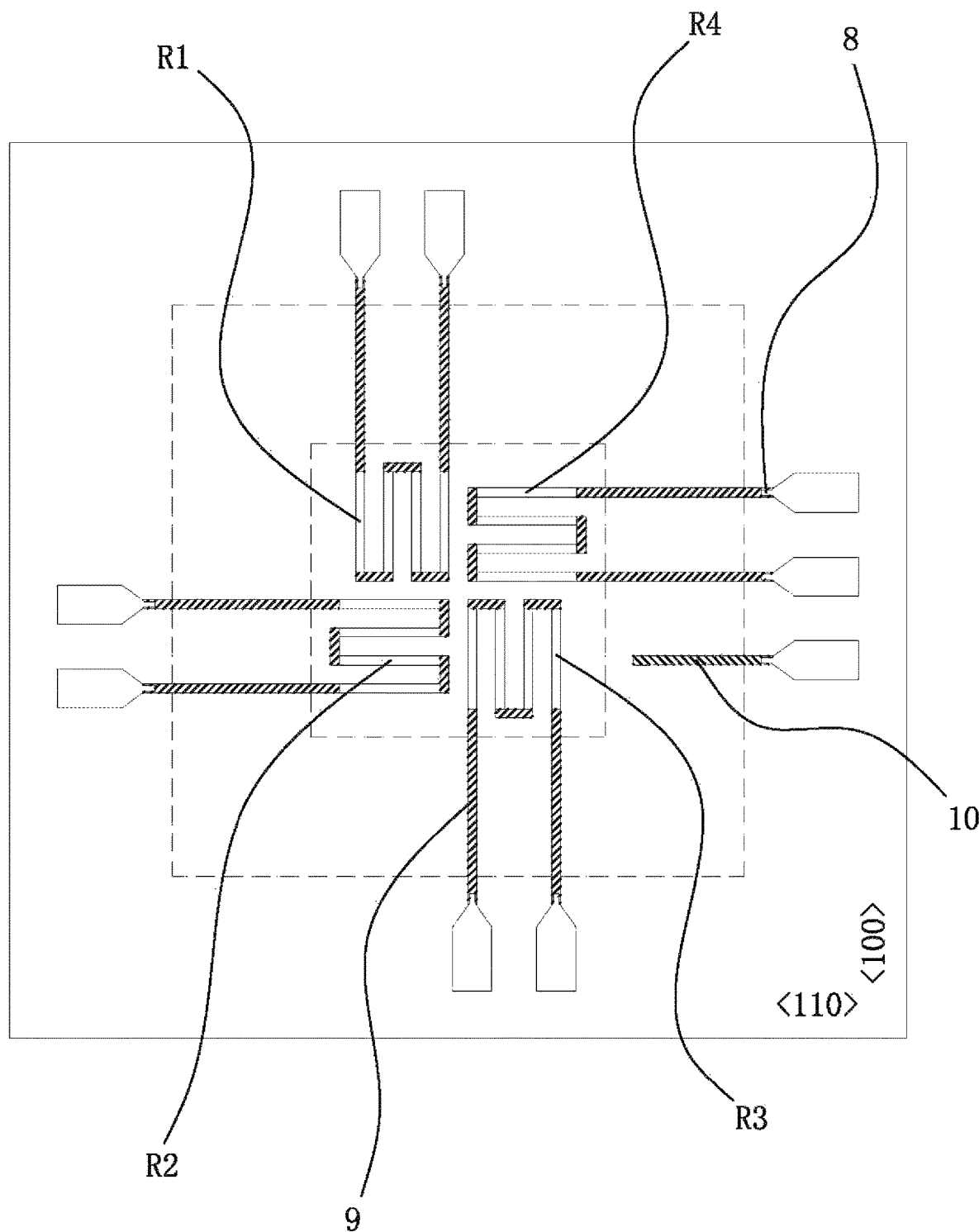
FIG. 3 is a plan view of the pressure sensor die in the first embodiment of this invention.
Figure 4:
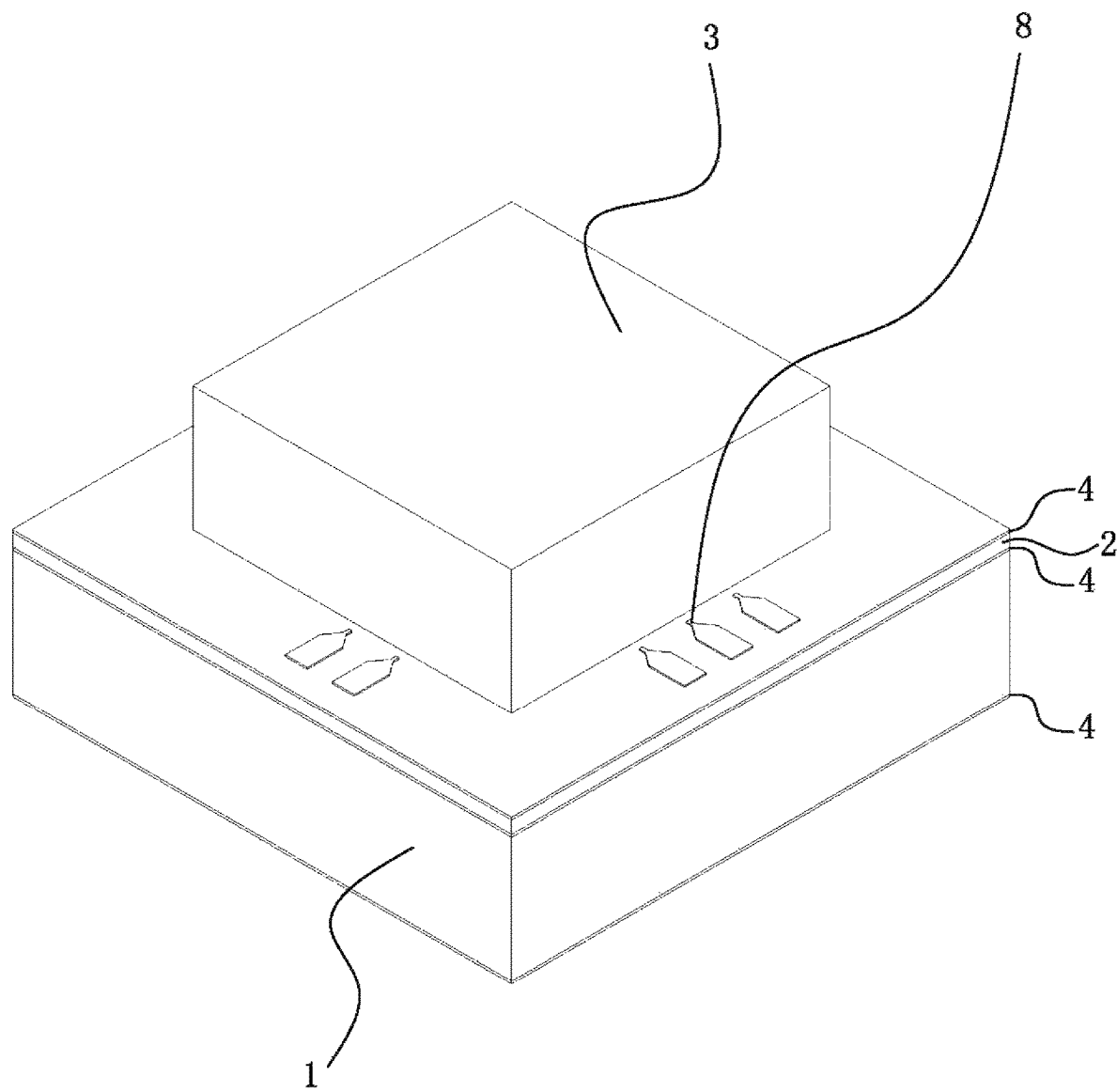
FIG. 4 is a perspective view of the pressure sensor die in the second embodiment of this invention.

With reference to FIGS. 1-3, a pressure sensor die is shown according to the first embodiment of the present invention. The pressure sensor die is primarily constructed of single crystalline silicon and comprises a substrate 6 and a cap 3 connected together. Using a silicon construction helps reduce the measurement errors caused by the mismatch in thermal expansion coefficients between dissimilar materials. A recess 5 is formed on the cap 3, which forms a sealed cavity after bonding with the substrate 6. In the plane view shown in FIG. 3, the bonded plane between the cap and the substrate is outlined by the dashed lines. The substrate further comprises a plurality of piezoresistive sensing elements 23, the critical portions of the piezoresistive sensing elements 23 are located inside the sealed cavity. Preferably, the sealed cavity is a vacuum sealed cavity; this further reduces the undesirable effects of foreign contaminants and local temperature fluctuations on the piezoresistive sensing elements 23. A silicon oxide layer 4 is formed between cap 3 and substrate 6. Metal contacts 8 are provided on top of silicon oxide layer 4. These metal contacts 8 are respectively connected to the terminals of piezoresistive sensing elements 23. External electrical circuits and components are only connected to metal contacts 8; thus it further reduces the effects of undesirable interferences on piezoresistive sensing elements 23.

With reference to FIG. 3, in this first embodiment of the present invention, four identical piezoresistive sensing elements 23 are provided on the substrate 6. These are R1 to R4 in which R1, R3 and R2, R4 are perpendicular to each other. Each piezoresistive sensing element employs a basic U-shaped design. Preferably, the piezoresistive sensing element 23 comprises a few U-shaped segments connected together to form a serpentine structure. In the first embodiment, piezoresistive sensing elements 23 are diffused resistors formed by doping selective regions on substrate 6. They are electrically insulated from one other via reversed biased PN junctions. The dopant type for piezoresistive sensing elements 23 is according to whether substrate 6 is p-type or n-type. For p-type substrate 6, an n-type dopant is used. For n-type substrate 6, a p-type dopant is used instead. Preferably, each piezoresistive sensing element 23 is further formed with type-A highly doped regions 9, the purpose of which is to increase the doping level in selective portions of piezoresistive sensing element 23. Therefore, the dopant type for the type-A highly doped regions 9 must be the same as that in the original non-highly doped portions of piezoresistive sensing element 23. Since the sheet resistance in the non-highly-doped portion is approximately 100 $\Omega$/square whereas the sheet resistance in the highly-doped portion is only 15 $\Omega$/square, having type-A highly doped regions 9 in each piezoresistive sensing element 23 locally reduces the electrical resistance there, thus forming highly conductive regions. As a result, the total electrical resistance in each piezoresistive sensing element 23 primarily comes from a few remaining longitudinal segments that are non-highly doped. In actual pressure measurements, it is these non-highly doped longitudinal segments, which are housed inside the sealed cavity and oriented in the same direction, that produce the largest electrical resistance change. Reducing the electrical resistance of piezoresistive sensing elements 23 in selective regions using type-A highly doped regions 9 therefore increases the overall percentage change in the electrical resistance of piezoresistive sensing element 23; and hence improves the measurement accuracy of the pressure sensor. Moreover, through the connections between the metal contacts 8 and the type-A highly doped regions 9, good electrical contacts between metal contacts 8 and piezoresistive sensing elements 23 can be assured. Additionally, type-B highly doped regions 10 and their associated metal contacts 8 are further provided, the purpose of which is for making electrical connections between external electrical circuit and the remaining regions of substrate 6 that are outside and therefore do not constitute a part of piezoresistive sensing elements 23. These electrical connections provide the necessary reverse bias for the PN junctions. The dopant type for these type-B highly doped regions must therefore be the same as that in substrate 6 to ensure that the metal contacts 8 makes good electrical contacts with substrate 6.

Figure 8:
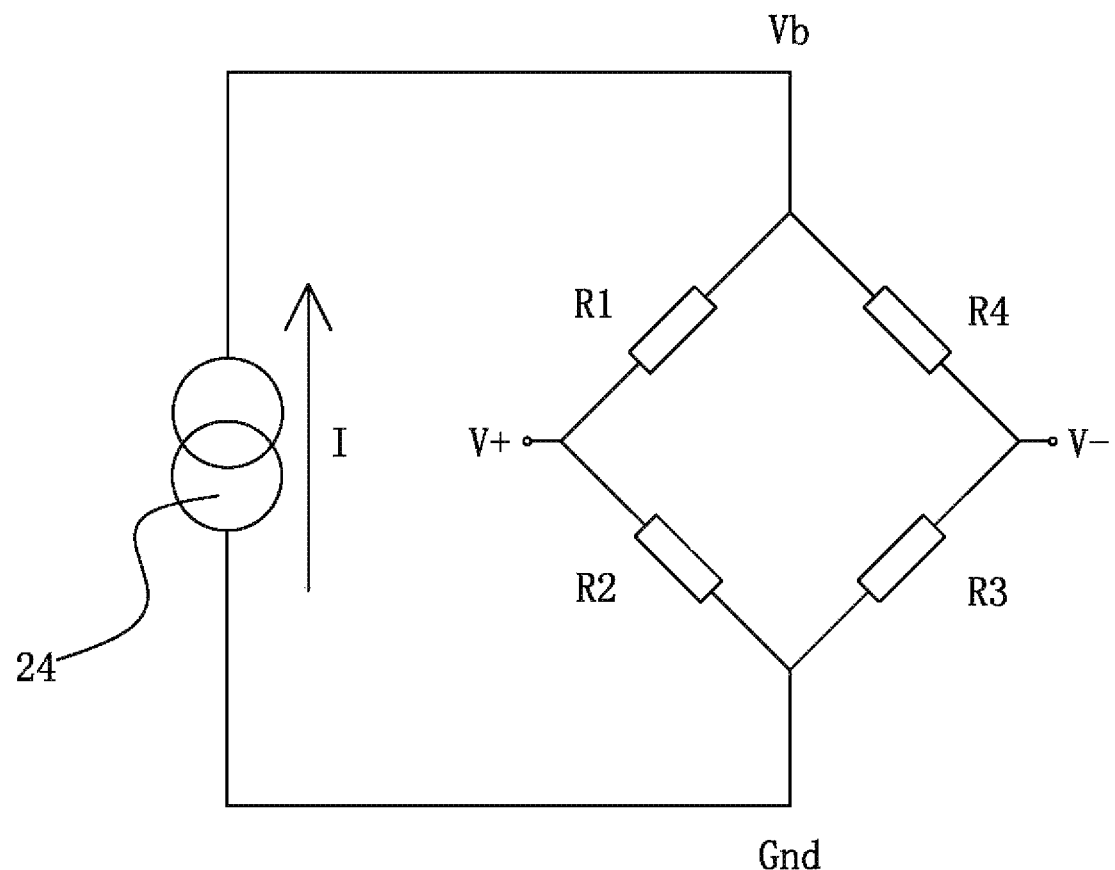
FIG. 8 is a circuit diagram of the piezoresistive sensing elements connected in a Wheatstone bridge configuration.

Since the four piezoresistive sensing elements R1 to R4 are identical, when the pressure sensor die is not subjected to an external pressure, the electrical resistance in R1 to R4 should be the same in theory. Preferably, the two perpendicular sets of piezoresistive sensing elements, R1, R3 and R2, R4, are oriented along different crystallographic directions such that when the pressure sensor die is uniformed compressed and free to deform under the external pressure, the difference in the piezoresistance effect between the two sets of piezoresistive sensing elements, R1, R3 and R2, R4, is maximized, thus resulting in unequal electrical resistance changes. Stress, however, is not the only factor that affects the electrical resistance values in piezoresistive sensing elements 23. Other factors, such as the temperature in the environment, will change the electrical resistance values as well. For this, preferably and with reference to FIG. 8, piezoresistive sensing elements R1 to R4 are electrically connected in a Wheatstone bridge configuration. A constant current source 24 supplies the electric current going through the Wheatstone bridge. The external pressure can be calculated by measuring the voltage difference between points V+ and V−. When the pressure sensor die is not subjected to external pressure, the electrical resistances in piezoresistive sensing elements R1 to R4 are almost identical; the voltage between points V+ and V− is then close to zero. On the other hand, when an external pressure induces unequal electrical resistance changes between R1, R3 and R2, R4, a voltage develops between points V+ and V−. A major advantage of the Wheatstone bridge configuration is the reduction of common-mode errors. For example, as the temperature changes, the electrical resistances of all four piezoresistive sensing elements change by about the same amount. As a result, when there is no external pressure, the voltage between points V+ and V− remains close to zero. In the present invention, the Wheatstone bridge can be powered by a constant voltage source or a constant current source, but a constant current source is preferred because the negative temperature coefficient of silicon piezoresistance effect is partially offset by the positive temperature coefficient of resistance, resulting in an overall reduced scale factor error over temperature. Furthermore, the bridge voltage, represented by Vb which can be measured, contains temperature information which is useful for further temperature error correction.

In comparison with existing technologies in which the piezoresistive sensing elements are all oriented along the same direction, the piezoresistive sensing elements in the present invention are oriented along two perpendicular directions. Therefore in pressure measurements, the pressure information collected by the piezoresistive sensing elements is more complete in the present invention. For example, in conventional silicon MEMS diaphragm-type pressure sensors, the pressure signal is detected by two sets of piezoresistive sensing elements oriented along the same direction, where each set contains two piezoresistive sensing elements. Due to geometric constraints at the diaphragm edge, the shape and layout of the two sets of piezoresistive sensing elements often cannot be made identical. This can give rise to a mismatch in the electrical resistance values or in the temperature coefficients of resistance between the two sets, resulting in an incomplete cancellation of common mode errors after processing through the Wheatstone bridge. Although this residual error can be further corrected via analog or digital compensation, some pressure accuracy is inevitably sacrificed. In contrast, the pressure signal in the present invention is derived from the differential output of two sets of piezoresistive sensing elements which are identical in shape and layout. Hence the pressure accuracy can be higher.

With reference to FIGS. 1 and 3, the preferable size of the present pressure sensor die is approximately 1.6 mm in length, 1.6 mm in width and 1 mm in thickness. The internal sealed cavity measures approximately 0.4 mm in length, 0.4 mm in width and 0.2 mm in height. In manufacturing, an 8 inch silicon wafer can contain thousands to over 10,000 gross pressure sensor dice, thus resulting in a significant reduction in die cost. However, it should be noted that the foregoing dimensions of the preferred embodiment are for illustrative purposes only. The present invention is not limited to this embodiment and all dimensions can be tailored for a particular design.

In the first embodiment, the piezoresistive sensing elements 23 are electrically insulated by reverse biased PN junctions, the leakage current of which increases exponentially with temperature. As the temperature rises above 150° C., the insulating property of the reverse biased PN junction will fail. Therefore the first embodiment is only suitable for applications in which the temperature is below 150° C.

With reference to FIGS. 4-7, a pressure sensor die is shown according to the second embodiment of the present invention. The operating principle, die size and external electrical circuit in this embodiment are the same as those in the first embodiment with the exception that the substrate 6 is using an SOI construction which comprises a handle layer 1, a device layer 2, and a silicon oxide layer 4 between handle layer 1 and device layer 2 all connected together. The silicon oxide layer 4 is also referred to as a "buried" silicon oxide layer and serves to be the electrical insulation between handle layer 1 and device layer 2. Distinct from the first embodiment, the piezoresistive sensing elements 23 in the second embodiment are formed on device layer 2. Moreover, a silicon oxide layer 4 is formed along the sidewalls of each piezoresistive sensing element 23. As a result, each piezoresistive sensing element is completely wrapped around and fully insulated with a layer of silicon oxide 4 on the top, the bottom and along the sides. Not only does this dielectric isolation scheme reduce crosstalk and interference among sensing elements, it also enables the pressure sensor die to operate at temperature as high as 250° C. and not limited by the PN junction insulation failure as in the first embodiment. Furthermore, type-A highly doped regions 9 are formed at the two terminals as well as at the turnaround corners of each piezoresistive sensing element 23, the purpose of which is to increase the doping level in selective portions of piezoresistive sensing element 23, thus forming high conductive regions, the function of which is the same as in the first embodiment. However, the piezoresistive sensing elements 23 in the second embodiment are single crystalline silicon resistors formed on device layer 2, the dopant type for the type-A highly doped regions 9 must therefore be the same as that in device layer 2. In this embodiment, the thickness of device layer 2 is approximately 2 μm and the thickness of the buried oxide layer is approximately 1 μm. However, it should be noted that the foregoing dimensions of the preferred embodiment are for illustrative purposes only. The present invention is not limited to this embodiment and all dimensions can be tailored for a particular design.

Figure 9:
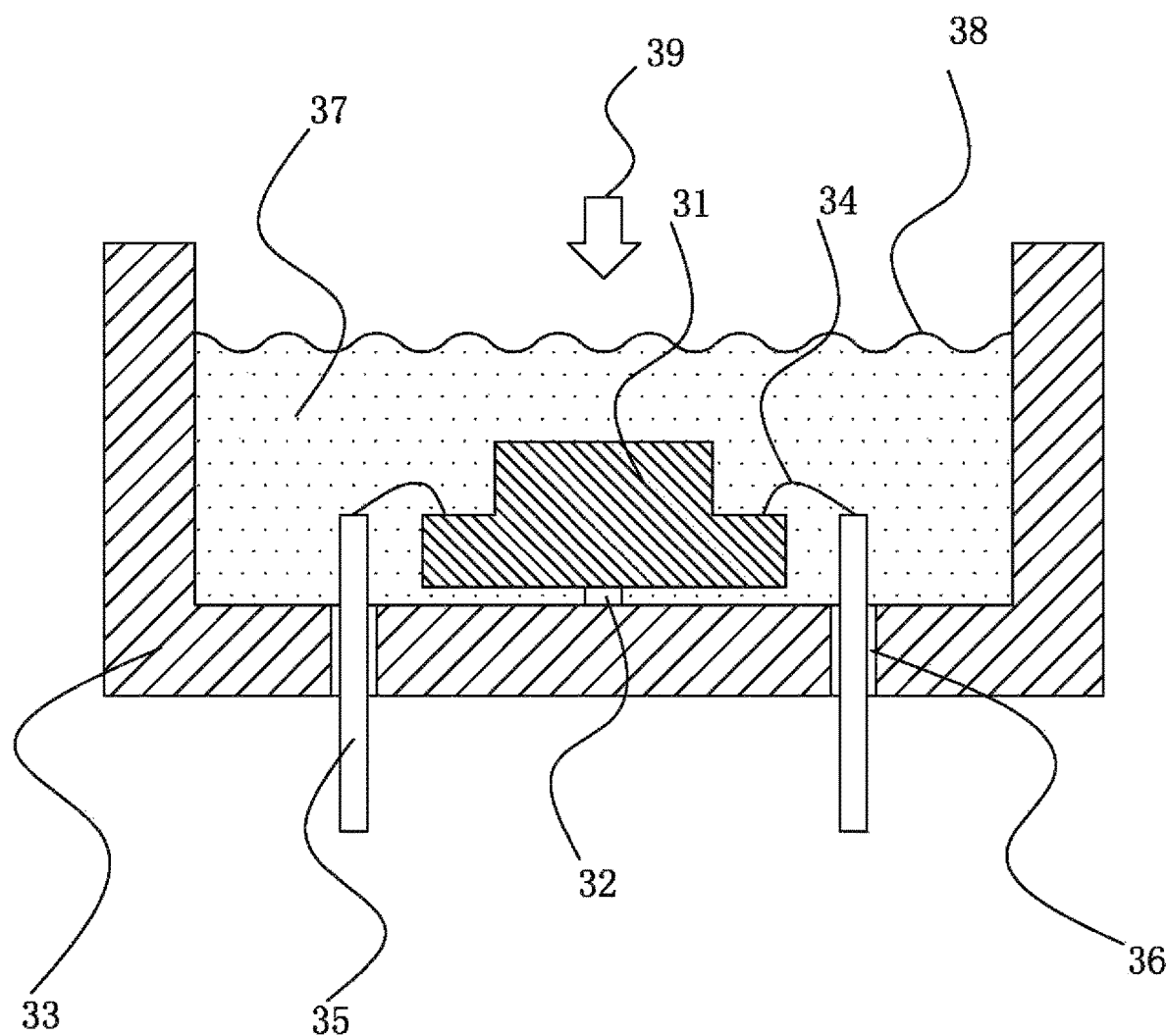
FIG. 9 is a diagrammatic view of the pressure sensor.

FIG. 9 illustrates a diagrammatic view of the pressure sensor, which can be applied to the first and the second embodiments of the pressure sensor die. Pressure sensor die 31 is installed within chamber 33, which is an enclosure defined within a metal housing. Chamber 33 is filled with electrical insulating fluid 37 in which pressure sensor die 31 is immersed. In one embodiment, metal diaphragm 38 is provided to seal both pressure sensor die 31 and electrical insulating fluid 37 within chamber 33. External pressure 39 acting on metal diaphragm 38 is transmitted via electrical insulating fluid 37 to the pressure sensor die 31. Preferably, metal diaphragm 38 is a corrugated baffle with a low stiffness; so almost all of external pressure 39 is transmitted to pressure sensor die 31. Furthermore, the contact between pressure sensor die 31 and the chamber housing is kept to a minimum. For example, pressure sensor die 31 is only attached to the chamber housing through one or several dots or lines of die adhesive 32. Moreover, die adhesive 32 is compliant enough so that under the action of the hydrostatic pressure in electrical insulating fluid 37, pressure sensor die 31 is uniformly compressed and free to deform. Such installation further prevents packaging stresses, which can be caused by the deformation of the chamber housing due to external forces or temperature change, from being transmitted to pressure sensor die 31.

Preferably, said cavity within the pressure sensor die 31 formed between substrate 6 and cap 3 is vacuum sealed, so that the pressure measured by the pressure sensor is absolute pressure referenced to vacuum. In one embodiment, metal bond pads on pressure sensor die 31 are connected via bond wires 34 to metal pillars 35, which are in turn connected to the external electrical circuit. Metal pillars 35 are electrically insulated from one another by insulator 36.

Figure 5:
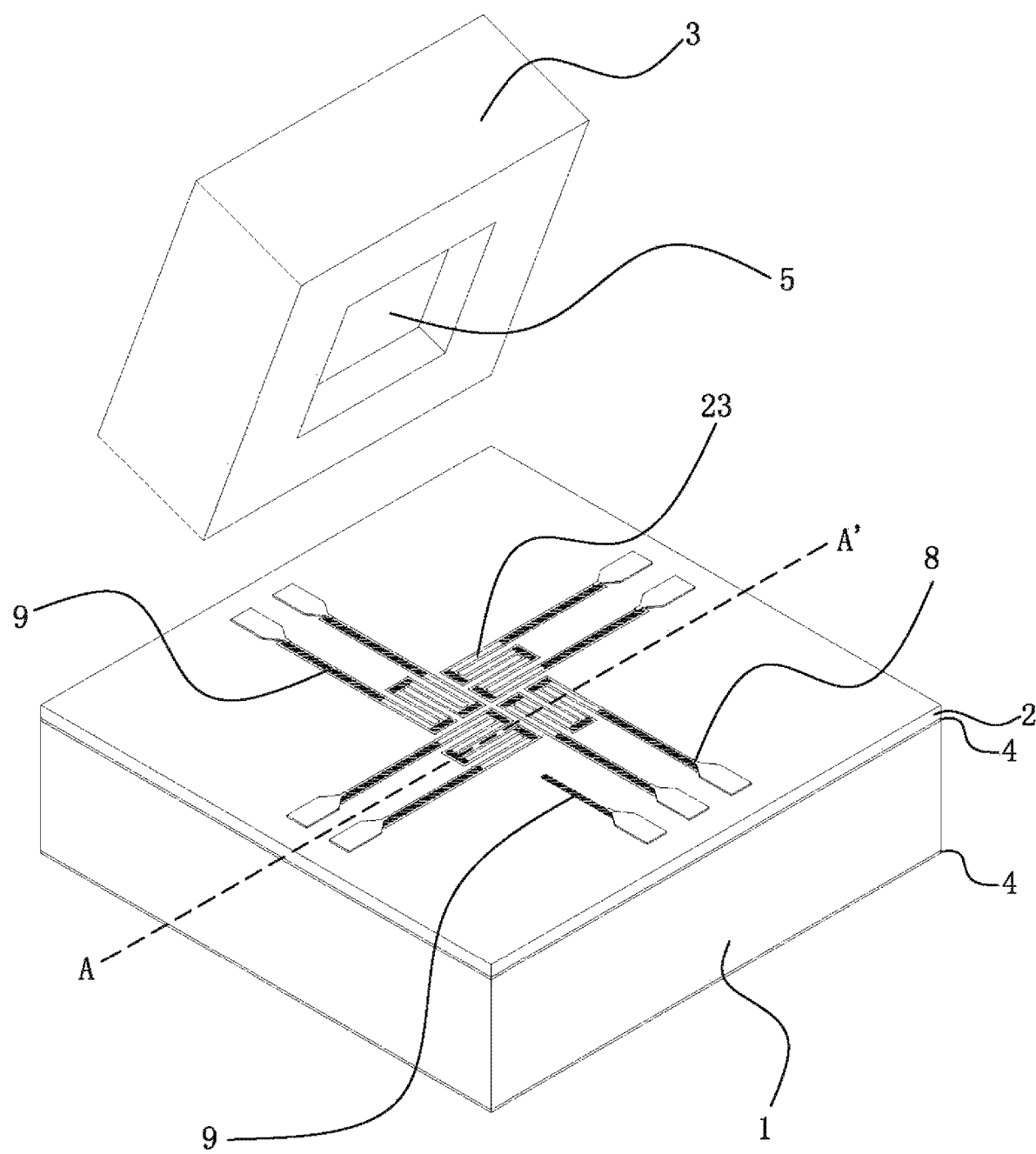
FIG. 5 is a perspective view of the pressure sensor die of FIG. 4 further with the cap detached revealing a recess underneath and further with the top silicon oxide layer removed revealing various features on the device layer in the second embodiment of this invention.
Figure 6:
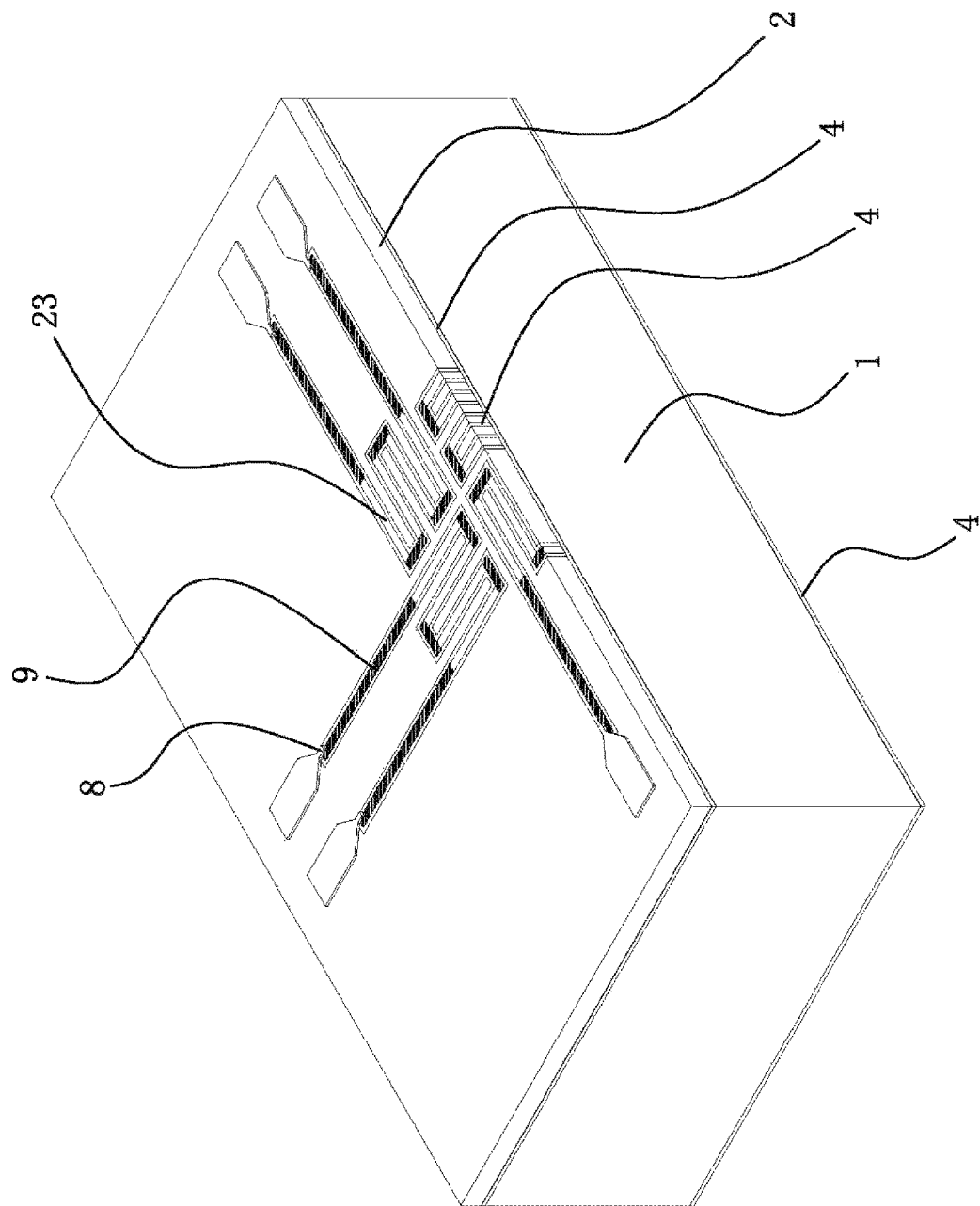
FIG. 6 is a cutaway view of the pressure sensor die of FIG. 5 along line AA'.

Next the crystallographic orientations of the pressure sensor die 31 and piezoresistive sensing elements 23 will be described. Regarding the silicon piezoresistance effect, besides varying with stress, the silicon electrical resistivity further varies with the dopant type (p or n), doping concentration, and crystallographic orientation since single crystalline silicon is anisotropic, the details for which are described in Y. Kanda, "A Graphical Representation of the Piezoresistance Coefficients in Silicon," IEEE Transactions on Electron Devices, vol. ED-29, no. 1, pp. 64-70, 1982. In particular, the change in electrical resistivity and its relationship with stresses and piezoresistive coefficients can be expressed as $$\Delta\rho_{11}/\rho = \pi_{11}\sigma_{11} + \pi_{12}\sigma_{22} + \pi_{13}\sigma_{33} + \pi_{14}\sigma_{23} + \pi_{15}\sigma_{13} + \pi_{16}\sigma_{12} \quad (1)$$

where 1, 2, 3 are the three orthogonal directions in a Cartesian coordinate system; $\Delta\rho_{11}/\rho$ is the relative change in silicon resistivity when both the electric field and electric current are along direction 1; $\sigma_{11}$, $\sigma_{22}$, $\sigma_{33}$ are the respective normal stresses along the 1, 2, 3 directions; $\sigma_{23}$, $\sigma_{13}$, $\sigma_{12}$ are the respective shear stresses along the 2-3, 1-3, 1-2 directions; and $\pi_{11}$, $\pi_{12}$, $\pi_{13}$, $\pi_{14}$, $\pi_{15}$, $\pi_{16}$ are the piezoresistive coefficients expressing the relationship between resistivity change and the various stresses. Assume that the top surface of substrate 6 of pressure sensor die 31 is perpendicular to direction 3 on plane 1-2, and that the piezoresistive sensing elements 23 are located on this plane. With reference to FIGS. 2 and 5, first of all, the critical (non-highly doped) portions of the four piezoresistive sensing elements 23 are facing a vacuum inside the sealed cavity. The plane 1-2 on which they are located is therefore a free surface. As a result, the stress components associated with the normal direction 3, i.e., $\sigma_{13}$, $\sigma_{23}$, $\sigma_{33}$, are all zero. Secondly, pressure sensor die 31 is installed inside chamber 33. The sensor die is uniformly compressed, and it is allowed to deform freely. Under these circumstances, the normal stresses acting on the external surfaces of the pressure sensor die are all comparable to the external pressure 39, and all the shear stresses are close to zero. Then further into the vacuum sealed cavity, on the said plane 1-2 on which piezoresistive sensing elements 23 are located, $\sigma_{12}$ is still close to zero, whereas $\sigma_{11}$ and $\sigma_{22}$ are comparable to each other and both scale approximately linearly with the external pressure 39 P. The magnitudes of $\sigma_{11}$ and $\sigma_{22}$ are somewhat smaller than P though. Preferably, the thickness of substrate 6 is larger than the cavity width. Otherwise, under the action of external pressure 39, substrate 6 will bulge toward the sealed cavity. This will lead to even smaller magnitudes of $\sigma_{11}$ and $\sigma_{22}$ in comparison with P. The sensitivity of the pressure sensor die will be reduced as a result but still usable. Summarizing all of the above, when applied to the critical (non-highly doped) portions of piezoresistive sensing elements 23, Equation (1) can be approximated by this simplified expression $$\Delta\rho_{11}/\rho \approx (\pi_{11}+\pi_{12})k\,P \quad (2)$$

where k is a constant less than 1.

Figure 10:
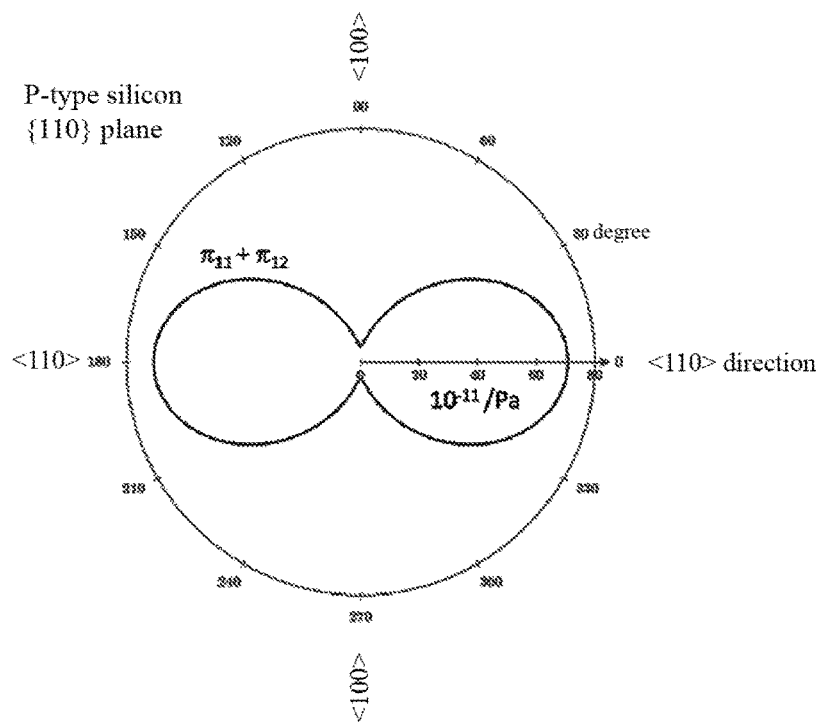
FIG. 10A is the variation of the piezoresistive coefficients $\pi_{11}+\pi_{12}$ versus crystallographic orientation on a {110} crystallographic plane of p-type silicon.
FIG. 10B is the variation of the piezoresistive coefficients $\pi_{11}+\pi_{12}$ versus crystallographic orientation on a {110} crystallographic plane of n-type silicon.
Figure 10B:
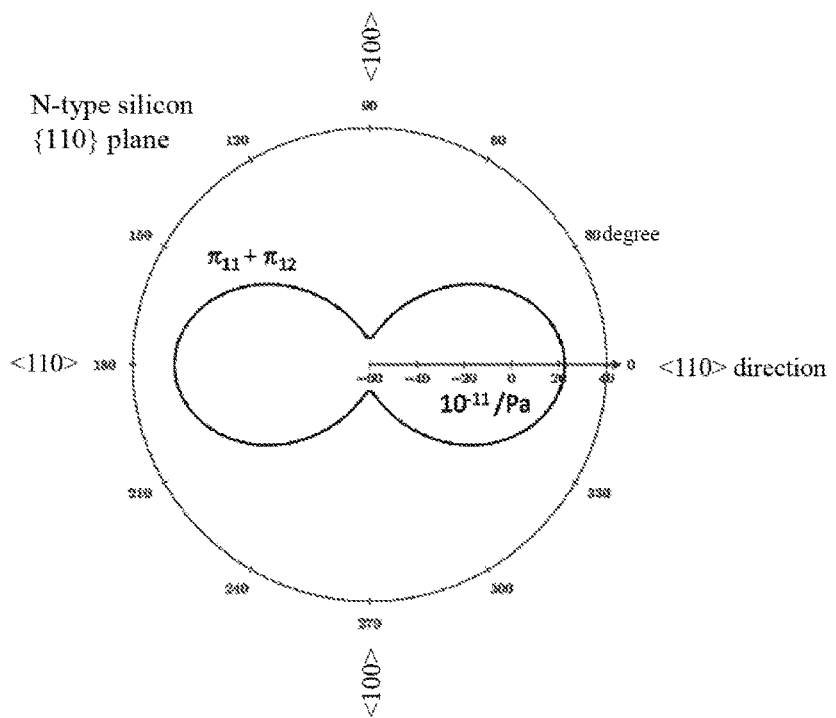
Figure 11:
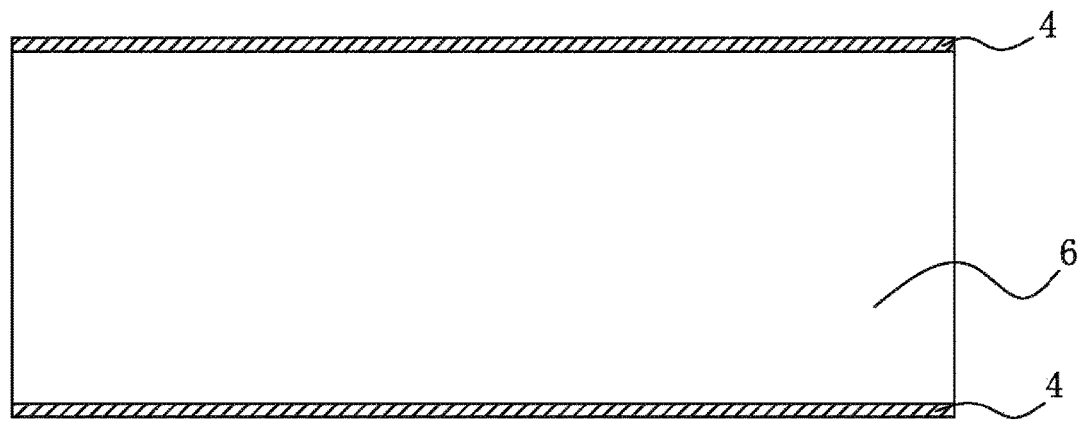
FIG. 11 is a cross-sectional view illustrating step 1 and step 2 of the fabrication process in the first embodiment of the pressure sensor die.
Figure 11:
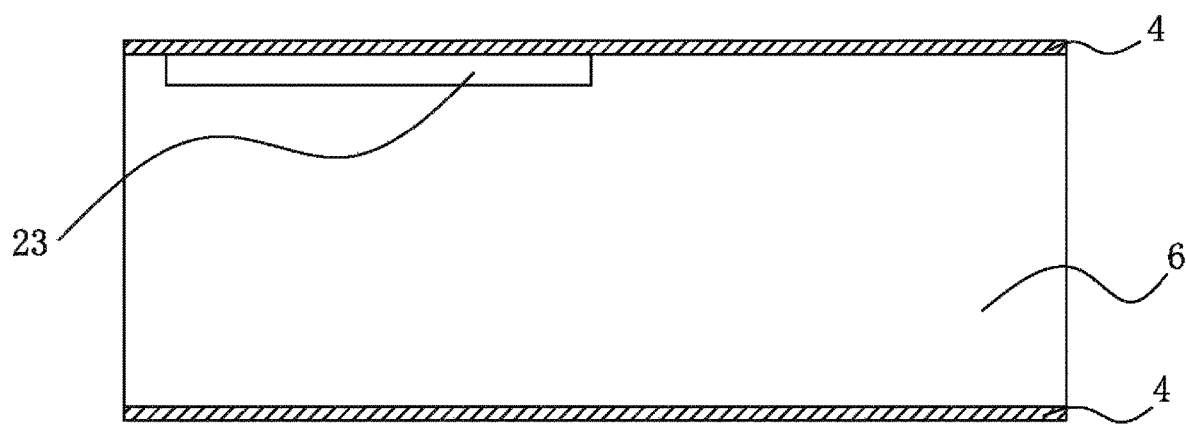
Figure 12:
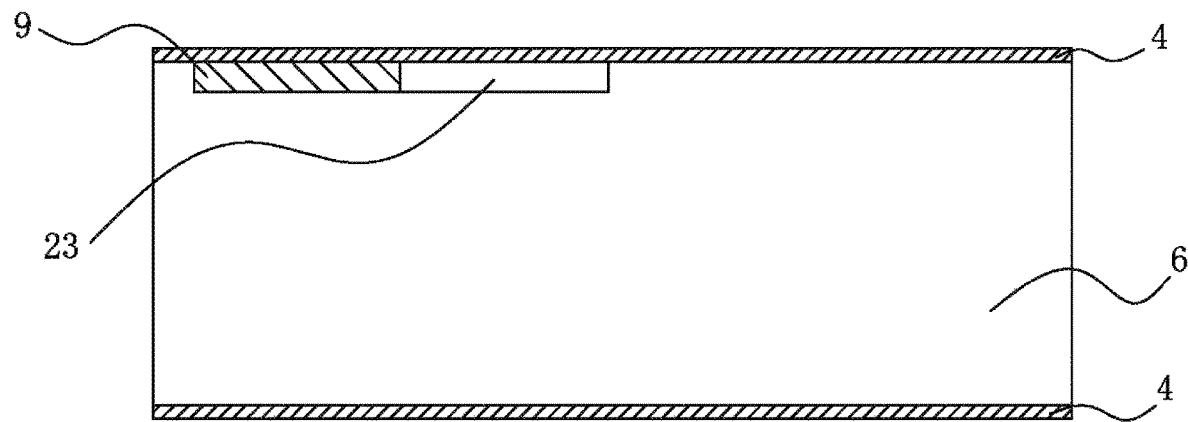
FIG. 12 is a cross-sectional view illustrating step 3 and step 4 of the fabrication process in the first embodiment of the pressure sensor die.
Figure 12:
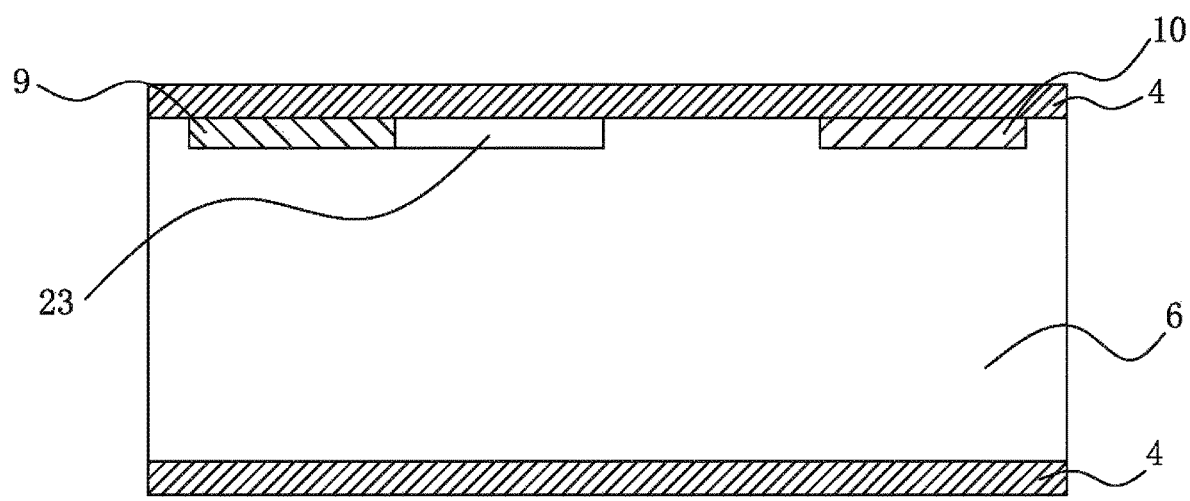
Figure 13:
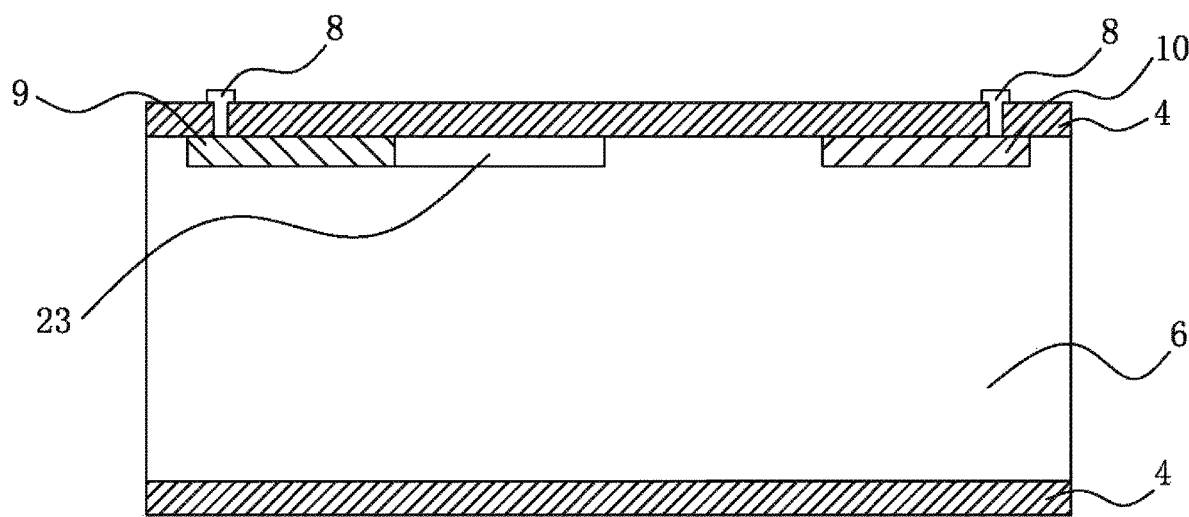
FIG. 13 is a cross-sectional view illustrating step 5 and step 6 of the fabrication process in the first embodiment of the pressure sensor die.
Figure 13:
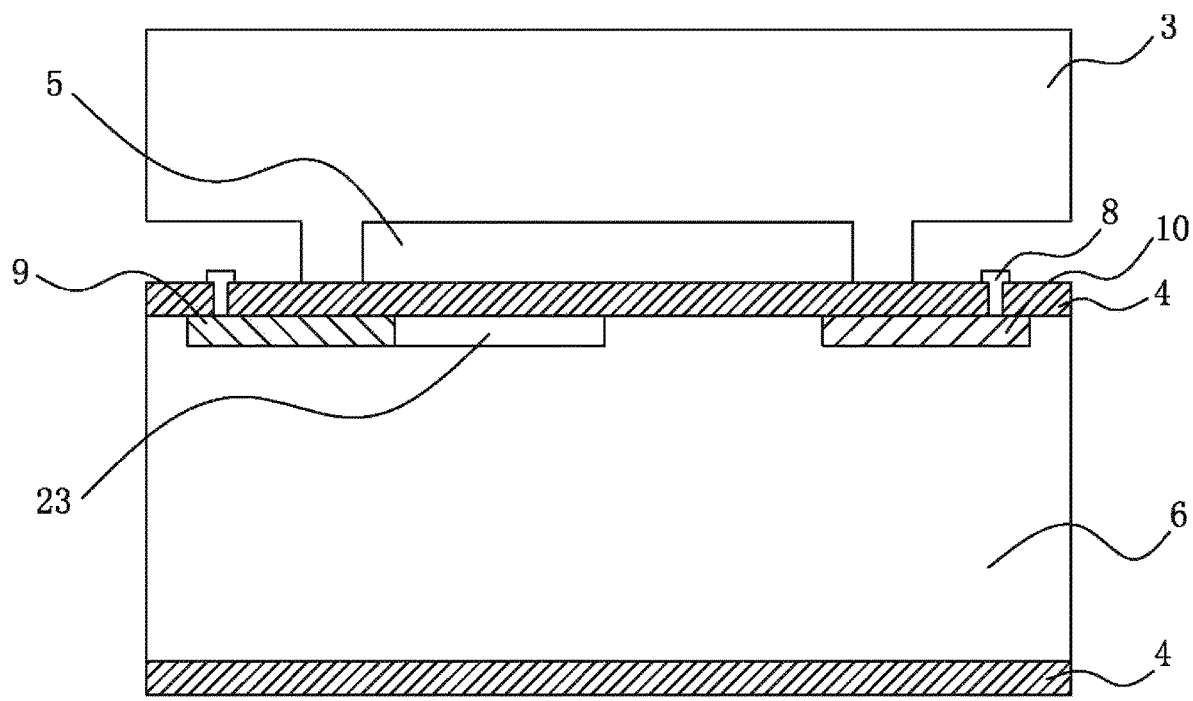
Figure 14:
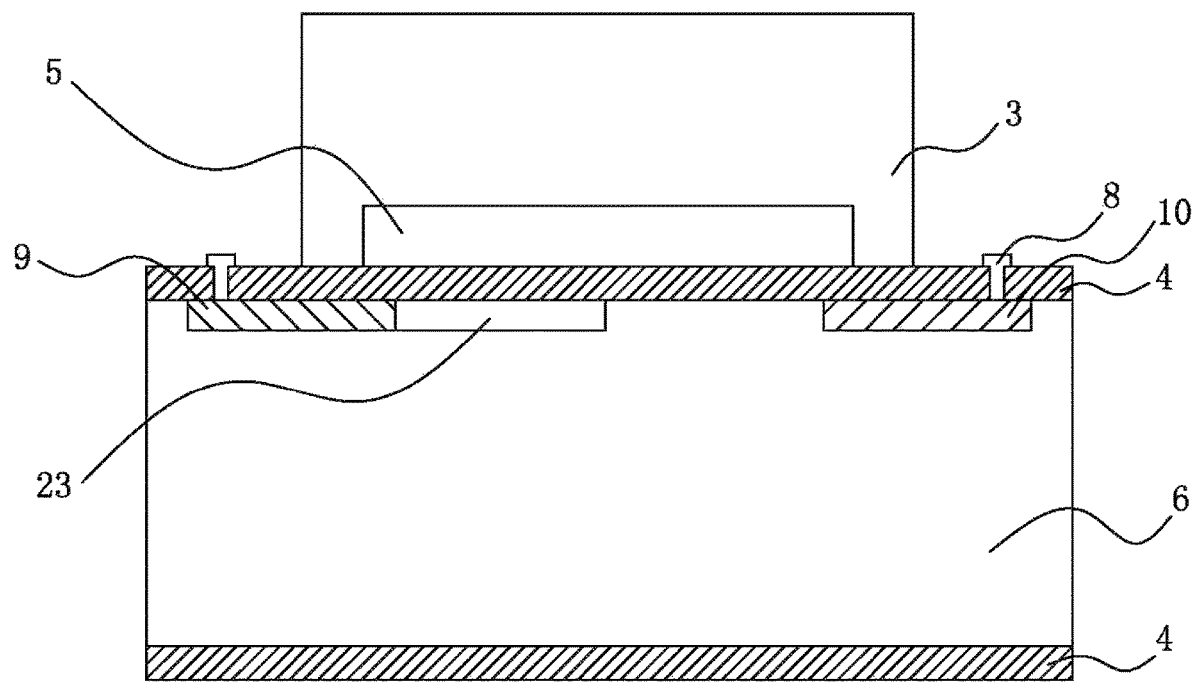
FIG. 14 is a cross-sectional view illustrating step 7 of the fabrication process in the first embodiment of the pressure sensor die.
Figure 15:
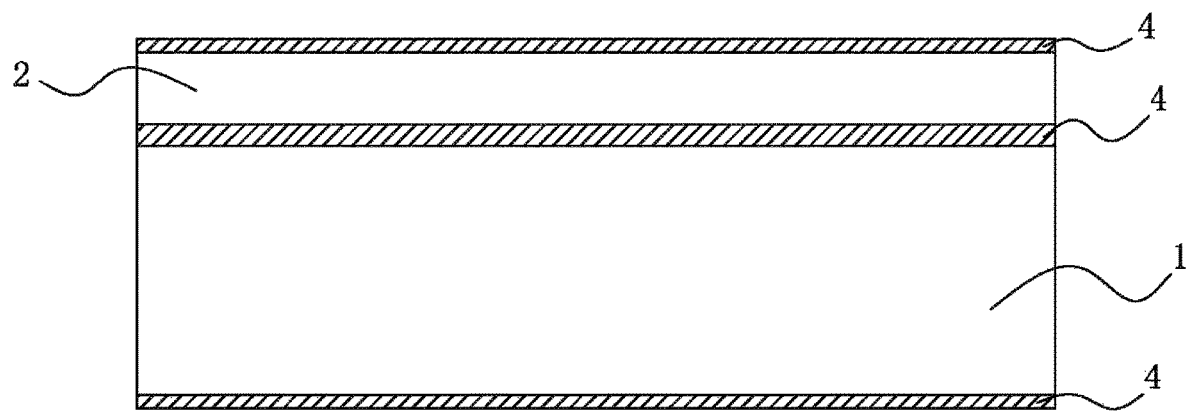
FIG. 15 is a cross-sectional view illustrating step 1 and step 2 of the fabrication process in the second embodiment of the pressure sensor die.
Figure 15:
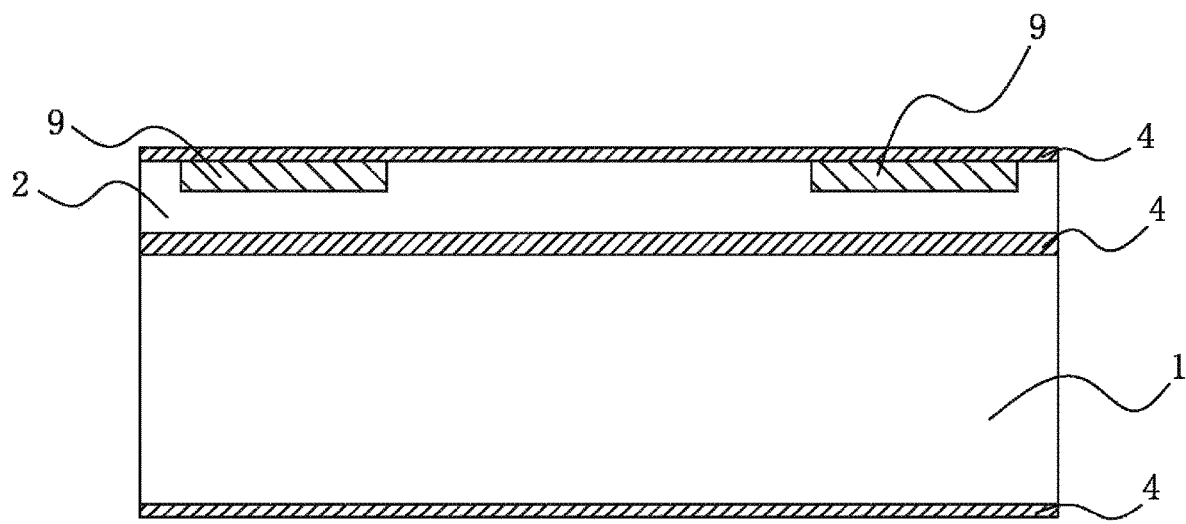
Figure 16:
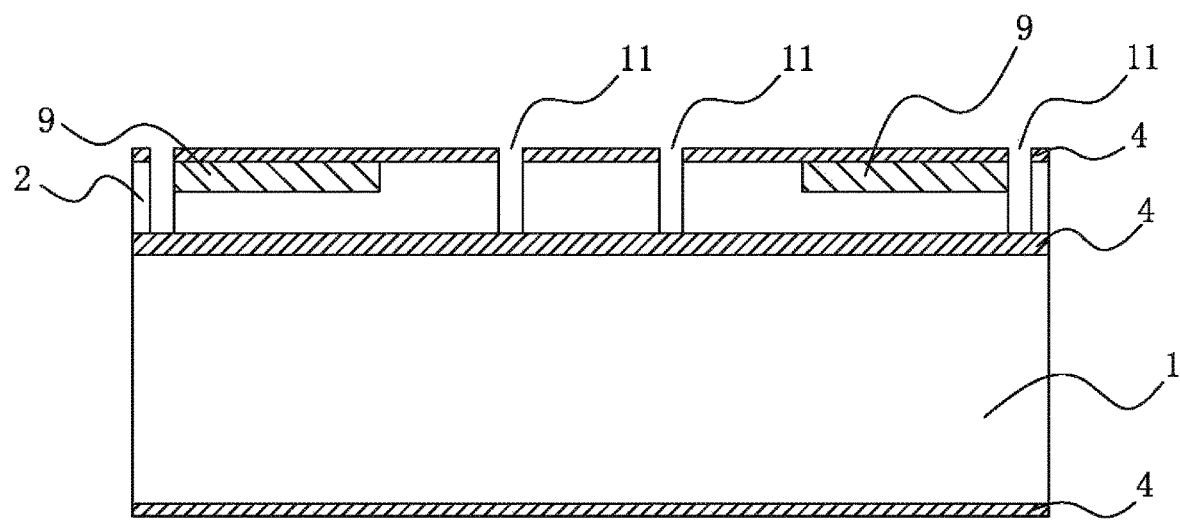
FIG. 16 is a cross-sectional view illustrating step 3 and step 4 of the fabrication process in the second embodiment of the pressure sensor die.
Figure 16:
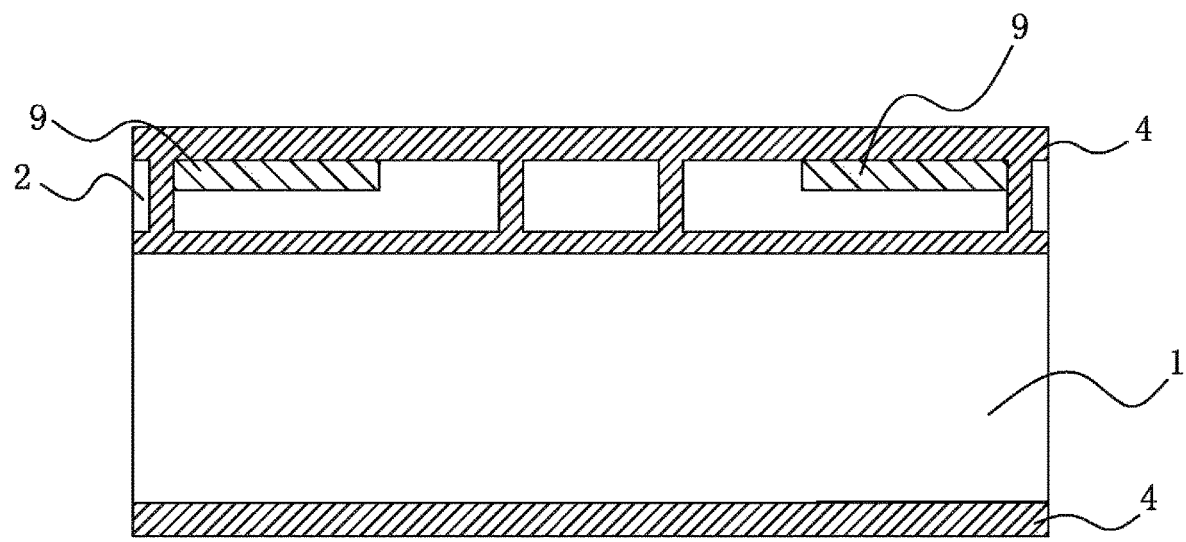
Figure 17:
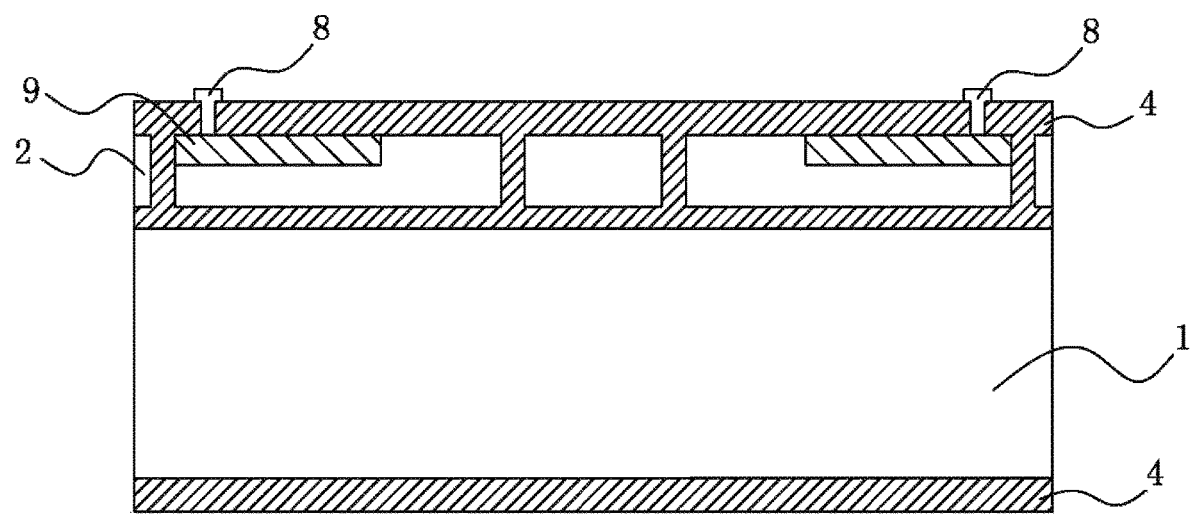
FIG. 17 is a cross-sectional view illustrating step 5 and step 6 of the fabrication process in the second embodiment of the pressure sensor die.
Figure 17:
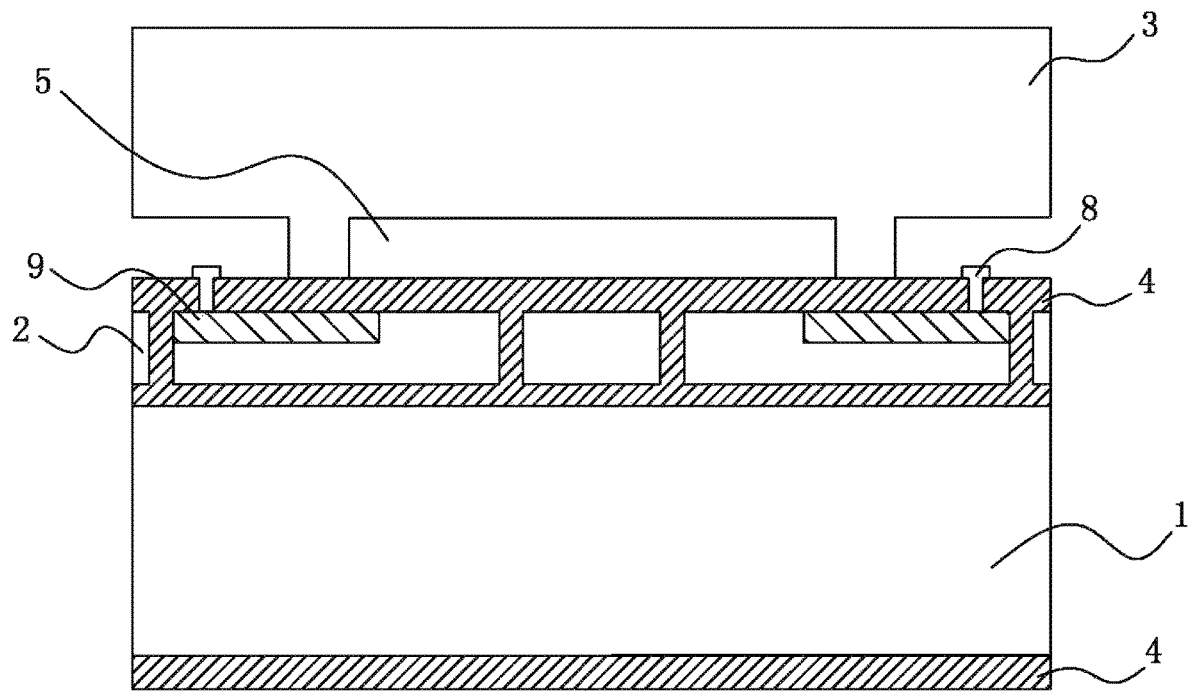
Figure 18:
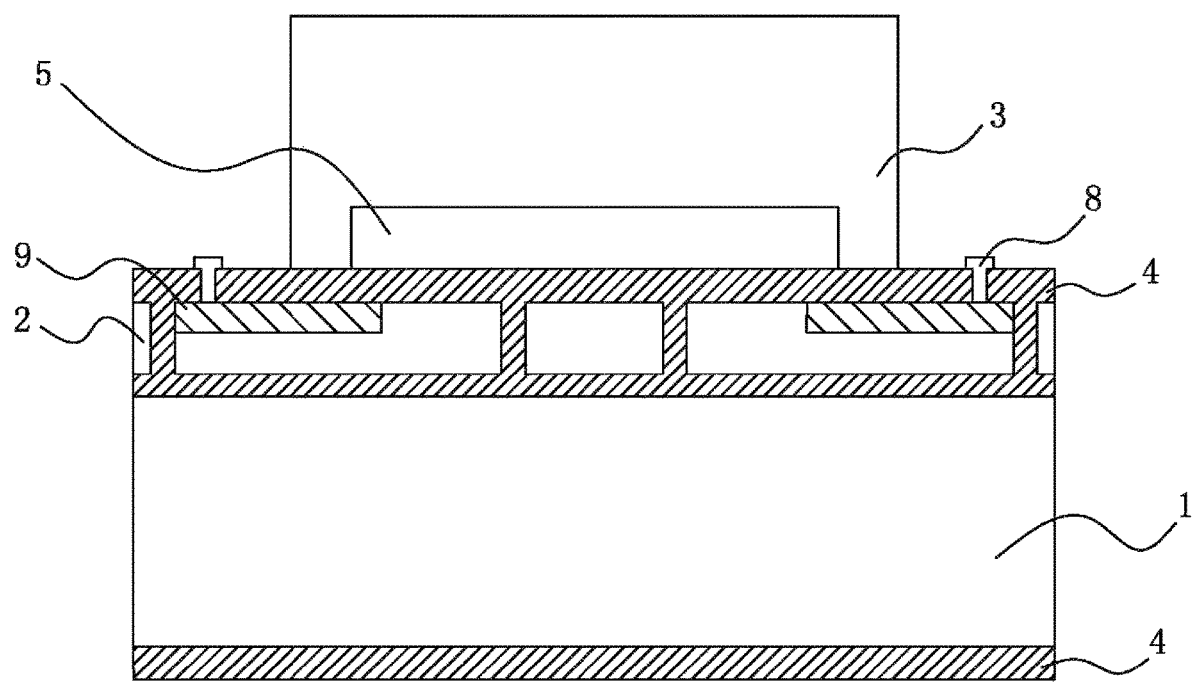
FIG. 18 is a cross-sectional view illustrating step 7 of the fabrication process in the second embodiment of the pressure sensor die.

Since electrical resistance is proportional to resistivity, from Equation (2), the electrical resistance changes in piezoresistive sensing elements 23 scale approximately linearly with the external pressure 39, whereas the pressure sensitivity is directly proportional to the piezoresistive coefficients $\pi_{11}+\pi_{12}$. However, since single crystalline silicon is anisotropic, $\pi_{11}+\pi_{12}$ will vary according to the orientations of plane 1-2 and direction 1 as well. For example, if plane 1-2 is a {110} crystallographic plane of silicon, with reference to FIG. 10, when direction 1 rotates from 0° to 360°, the piezoresistive coefficients $\pi_{11}+\pi_{12}$ will vary as shown in FIG. 10. Therefore on the {110} crystallographic plane of silicon, whether it is p-type or n-type silicon, $\pi_{11}+\pi_{12}$ will reach a maximum along the <110> direction and reach a minimum along the <100> direction orthogonal to <110>.

Figure 7:
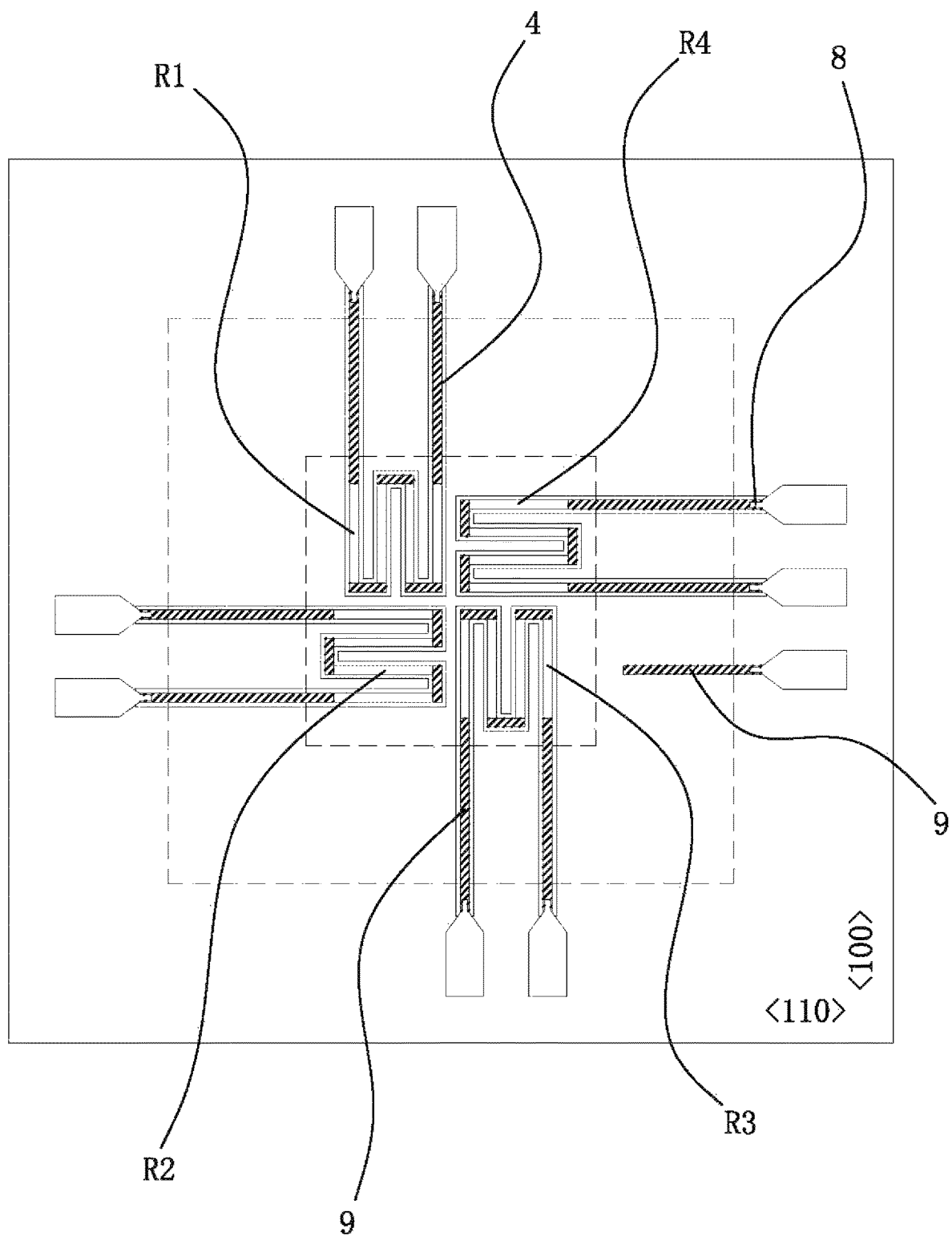
FIG. 7 is a plan view of the pressure sensor die in the second embodiment of this invention.

As described in the first and second embodiments of the pressure sensor die 31, preferably, the two sets of piezoresistive sensing elements R1, R3 and R2, R4 can be installed along different crystallographic orientations so that when the pressure sensor die 31 is uniformly compressed and deforms freely under the external pressure 39, the difference in piezoresistance effect between the two sets of piezoresistive sensing elements R1, R3 and R2, R4, i.e., the difference in the piezoresistive coefficients $\pi_{11}+\pi_{12}$ is maximized. This way, the electrical resistance change will be different and a voltage output will appear at the Wheatstone bridge. Preferably, the substrate 6 in the first embodiment and the device layer 2 in the second embodiment are formed on a {110} crystallographic plane of single crystalline silicon, and the two sets of piezoresistive sensing elements are respectively oriented along the orthogonal <100> and <110> crystallographic directions. With reference to FIGS. 3 and 7, the non-highly doped portions of piezoresistive sensing elements R1 and R3 are both oriented along the <100> direction. Therefore their electrical resistance changes are the same. Likewise, the non-highly doped portions of piezoresistive sensing elements R2 and R4 are both oriented along the <110> direction. Therefore their electrical resistance changes are the same as well but differ by the maximum amount from the electrical resistance changes of R1 and R3. Preferably, since the deformation under stress of single crystalline silicon is anisotropic, the cap 3 is also formed on a {110} crystallographic plane of single crystalline silicon, so that the pressure sensor die 31 is uniformly compressed. Moreover, on the bonded plane between cap 3 and substrate 6, the corresponding edges on cap 3 and substrate 6 are oriented along the same crystallographic direction; or the corresponding edges on cap 3 and handle layer 1 and device layer 2 are oriented along the same crystallographic direction. Other crystallographic orientations of substrate 6 and piezoresistive sensing elements 23 are also feasible, e.g., by referring to Y. Kanda's description.

Next, the first fabrication process for the pressure sensor die is described with reference to FIGS. 11 to 14. This fabrication technique can be applied to the first embodiment of the pressure sensor die. As described above, the starting material for substrate 6 is a single crystalline silicon wafer, followed by additional process steps as described in below.

Step 1, form a layer of silicon oxide 4 on the top surface and the bottom surface of the single crystalline silicon wafer by means of thermal oxidation or chemical vapor deposition method.

Step 2, using photolithography, first coat a layer of photoresist on the top surface of the single crystalline silicon wafer. Then expose the photoresist according to certain mask pattern. The exposed photoresist is then dissolved away with a developer, leaving the unexposed photoresist which is subsequently hard baked. This way the mask pattern is transferred onto the photoresist on the top silicon oxide layer 4. Then using ion implantation, the exposed areas on the top silicon oxide layer 4 is implanted with a dopant ion with sufficient energy to penetrate the silicon oxide layer 4 reaching substrate 6. Meanwhile, the ions are stopped by the hard-baked photoresist in the unexposed areas and will not reach substrate 6. This way, selective regions on substrate 6 are implanted, forming piezoresistive sensing elements 23 with a dopant species of the opposite type to substrate 6. If the substrate 6 is of p-type, then an n-type dopant, such as phosphorus ion, can be used. If the substrate 6 is of n-type, then a p-type dopant, such as boron ion, can be used. Lastly, the photoresist is removed. In addition to the ion implantation method, the dopant can also be introduced by a high temperature diffusion technique.

Step 3, using photolithography and ion implantation, form type-A highly doped regions 9 on the top surface of the single crystalline silicon wafer with a dopant species of the same type as piezoresistive sensing elements 23, thus forming highly conductive regions in which the electrical resistance is greatly reduced. If the substrate 6 is of p-type, then an n-type dopant, such as phosphorus ion, can be used. If the substrate 6 is of n-type, then a p-type dopant, such as boron ion, can be used.

Step 4, using photolithography and ion implantation, form type-B highly doped regions on the top surface of the single crystalline silicon wafer with a dopant species of the same type as substrate 6, thus forming highly conductive regions in which the electrical resistance is greatly reduced. If the substrate 6 is of p-type, then a p-type dopant, such as boron ion, can be used. If the substrate 6 is of n-type, then an n-type dopant, such as phosphorus ion, can be used. Afterward grow or deposit a silicon oxide layer 4 on the top surface and the bottom surface of the single crystalline silicon wafer and activate all the implanted dopant species.

Step 5, using photolithography followed by dry or wet etching, etch contact holes 8 through the silicon oxide layer 4 on top of the single crystalline wafer reaching type-A and type-B highly doped regions on substrate 6; using metal deposition, photolithography and etching, form metal interconnection patterns from contact holes 8 to peripheral bond pads.

Step 6, bond a single crystalline silicon cap wafer which was prefabricated with recesses 5 to the top of the processed single crystalline silicon wafer in vacuum to form the vacuum sealed cavity. The bonding technique includes silicon fusion bonding, eutectic bonding, solder bonding, and anodic bonding.

Step 7, using wafer dicing, cut the bonded silicon wafer into individual pressure sensor dice.

Next, the second fabrication process for the pressure sensor die is described with reference to FIGS. 15 to 18. This fabrication technique can be applied to the second embodiment of the pressure sensor die. As described above, the starting material is an SOI wafer that comprises a handle layer 1, device layer 2, and a buried silicon oxide layer 4 formed between the handle layer and the device layer, followed by additional process steps as described in below.

Step 1, form a layer of silicon oxide 4 on the top surface and the bottom surface of the SOI wafer by means of thermal oxidation or chemical vapor deposition method.

Step 2, using photolithography, first coat a layer of photoresist on the top surface of the SOI wafer. Then expose the photoresist according to certain mask pattern. The exposed photoresist is then dissolved away with a developer, leaving the unexposed photoresist which is subsequently hard baked. This way the mask pattern is transferred onto the photoresist on the top silicon oxide layer 4. Then using ion implantation, the exposed areas on the top silicon oxide layer 4 is implanted with a dopant ion with sufficient energy to penetrate the silicon oxide layer 4 reaching the device layer 2. Meanwhile, the ions are stopped by the hard-baked photoresist in the unexposed areas and will not reach the device layer 2. This way, selective regions on device layer 2 are implanted, forming type-A highly doped regions 9 with a dopant species of the same type as device layer 2, where the electrical resistance is greatly reduced thus forming highly conductive regions. If the device layer 2 is of p-type, then a p-type dopant, such as boron ion, can be used. If the device layer 2 is of n-type, then an n-type dopant, such as phosphorus ion, can be used. Lastly, the photoresist is removed. In addition to the ion implantation method, the dopant can also be introduced by a high temperature diffusion technique.

Step 3, using photolithography, transfer a mask pattern onto a layer of photoresist on the top surface of the SOI wafer. Then etch the top silicon oxide layer 4 using dry or wet etching to form trenches 11 reaching down to device layer 2. Afterward further etch trenches 11 from device layer 2 down to buried silicon oxide layer 4 using deep reactive ion etching or other dry or wet etching methods to form piezoresistive sensing elements 23.

Step 4, use thermal oxidation or chemical vapor deposition method to form a silicon oxide layer 4 that fills trenches 11 and in so doing activate all implanted dopant species. As a result, the piezoresistive sensing elements 23 are completely wrapped around by a layer of silicon oxide insulation.

Step 5, using photolithography followed by dry or wet etching, etch contact holes 8 through the top silicon oxide layer 4 on top of the highly conductive regions 9 reaching the type-A highly doped regions on device layer 2; using metal deposition, photolithography and etching, form metal interconnection patterns from contact holes 8 to peripheral bond pads.

Step 6, bond a single crystalline silicon cap wafer which was prefabricated with recesses 5 to the top of the processed SOI wafer in vacuum to form the vacuum sealed cavity. The bonding technique includes silicon fusion bonding, eutectic bonding, solder bonding, and anodic bonding.

Step 7, using wafer dicing, cut the bonded silicon wafer into individual pressure sensor dice.

The etching methods are selected from one or more of the following methods: dry etching or wet etching; the dry etching for silicon comprises deep reactive ion etching, reactive ion etching, and gaseous xenon difluoride etching; and the dry etching for silicon oxide comprises reactive ion etching, plasma etching, and hydrofluoric acid vapor etching.

The wet etching of silicon comprises one kind or a combination of the following etchants: potassium hydroxide, tetramethylammonium hydroxide or ethylenediamine pyrocatechol.

The wet etching of silicon oxide comprises one kind or a combination of the following etchants: hydrofluoric acid or buffered hydrofluoric acid.

The pressure sensor die in the present invention utilizes a non-diaphragm-type novel structure. The sensor die is uniformly compressed by the external pressure, and the resulting internal stresses are converted via the silicon piezoresistance effect into electrical resistance changes in the piezoresistive sensing elements 23. The anisotropy of silicon piezoresistance is further exploited for the optimal placement of two sets of piezoresistive sensing elements 23 on the same crystallographic plane but along two different crystallographic orientations such that the difference in the electrical resistance changes between the two sets is maximized, thus enabling the measurement of pressure up to 200 MPa. In addition, the critical portions of piezoresistive sensing elements 23 are placed inside a vacuum sealed cavity. This reduces the undesirable influence from the external environment and foreign materials, and increases the reliability and accuracy of the pressure sensor. Moreover, each piezoresistive sensing element 23 is completely wrapped around and isolated by a layer of silicon oxide insulator 4. This reduces crosstalk and interference among piezoresistive sensing elements 23. Such dielectric isolation scheme also enables the present pressure sensor to operate at high temperature. Furthermore, connecting the piezoresistive sensing elements in a Wheatstone bridge configuration is the key to reduce common-mode errors and temperature effects. Finally, manufacturing the pressure sensor die on a silicon wafer using microfabrication techniques significantly reduces the manufacturing cost of the pressure sensor die. As described above, a single 8-inch silicon wafer can produce thousands to over 10,000 pressure sensor dice.

Lastly, it will be appreciated by those of ordinary skill in the art that many variations in the foregoing preferred embodiments are possible while remaining within the scope of the present invention. The present invention should thus not be considered limited to the preferred embodiments or the specific choices of materials, configurations, dimensions, applications or ranges of parameters employed therein.

What we claim in our invention:

1. A pressure sensor comprising:
   a chamber and a pressure sensor die provided within said chamber;
   wherein said chamber is filled with an electrically insulating fluid; and said pressure sensor die is immersed in said electrically insulating fluid;
   said pressure sensor die is attached to said chamber through at least one dot or line of die adhesive, resulting in said pressure sensor die being uniformly compressed by pressure and free to deform;
   said pressure sensor die is constructed of single crystalline silicon and includes a substrate and a cap connected together;
   wherein a recess is formed on said cap; said recess and said substrate form a sealed cavity; a silicon oxide layer is formed between said substrate and said cap;
   said substrate includes at least two sets of piezoresistive sensing elements; said piezoresistive sensing elements are located inside said sealed cavity; said two sets of piezoresistive sensing elements are perpendicular to each other, with each set of piezoresistive sensing elements oriented in a different crystallographic direction.

2. The pressure sensor according to claim 1, wherein said sealed cavity is a vacuum sealed cavity.

3. The pressure sensor according to claim 1, wherein a metal contact is provided at the terminals of each of said piezoresistive sensing elements.

4. The pressure sensor according to claim 1, wherein each of said piezoresistive sensing elements comprises a plurality of connected U-shaped segments.

5. The pressure sensor according to claim 1, wherein said piezoresistive sensing elements are electrically connected in a Wheatstone bridge configuration.

6. The pressure sensor according to claim 1, wherein said substrate is formed on a {110} crystallographic plane of p-type silicon; said piezoresistive sensing elements are formed on n- type doped regions of said substrate; one set of said piezoresistive sensing elements is oriented along a <100> crystallographic direction, and the other set of said piezoresistive sensing elements is oriented along a <110> crystallographic direction.

7. The pressure sensor according to claim 1, wherein said substrate is formed on a {110} crystallographic plane of n-type silicon; said piezoresistive sensing elements are formed on p-type doped regions of said substrate; one set of said piezoresistive sensing elements is oriented along a <100> crystallographic direction, and the other set of said piezoresistive sensing elements is oriented along a <110> crystallographic direction.

8. The pressure sensor according to claim 6, wherein said cap and said substrate are both cuboids; said cap is formed on a {110} crystallographic plane of single crystalline silicon; and on the bonded plane between said cap and said substrate, the corresponding edges of said cap and said substrate are oriented along the same crystallographic direction.

9. The pressure sensor according to claim 1, wherein said substrate of said pressure sensor die uses a silicon-on-insulator construction;
said silicon-on-insulator construction includes a handle layer, a device layer, and a buried silicon oxide layer formed between said handle layer and device layer;
said piezoresistive sensing elements are formed on said device layer.

10. The pressure sensor according to claim 9, wherein a silicon oxide insulating layer is formed on the top, the bottom and along the sides of said piezoresistive sensing element.

11. The pressure sensor according to claim 9, wherein said device layer is formed on a {110} crystallographic plane of p-type silicon; said piezoresistive sensing elements are formed on said p-type silicon of said device layer; one set of said piezoresistive sensing elements is oriented along a <100> crystallographic direction, and the other set of said piezoresistive sensing elements is oriented along a <110> crystallographic direction.

12. The pressure sensor according to claim 9, wherein said device layer is formed on a {110} crystallographic plane of n-type silicon; said piezoresistive sensing elements are formed on said n-type silicon of said device layer; one set of said piezoresistive sensing elements is oriented along a <100> crystallographic direction, and the other set of said piezoresistive sensing elements is oriented along a <110> crystallographic direction.

13. The pressure sensor according to claim 9, wherein said substrate is a cuboid; said handle layer is formed on a {110} crystallographic plane of single crystalline silicon; and the corresponding edges of said handle layer and said device layer are oriented along the same crystallographic direction.

14. The pressure sensor according to claim 9, wherein said cap is a cuboid; said cap is formed on a {110} crystallographic plane of single crystalline silicon; and the corresponding edges of said cap and said device layer are oriented along the same crystallographic direction.

15. The pressure sensor according to claim 1, wherein said chamber is an enclosure within a metal housing.

16. The pressure sensor according to claim 15, wherein a metal diaphragm is further provided; said metal diaphragm seals said electrically insulating fluid and said pressure sensor die in said chamber; and external pressure to be measured is transmitted from said metal diaphragm to said pressure sensor die.

17. The pressure sensor according to claim 7, wherein said cap and said substrate are both cuboids; said cap is formed on a {110} crystallographic plane of single crystalline silicon; and on the bonded plane between said cap and said substrate, the corresponding edges of said cap and said substrate are oriented along the same crystallographic direction.

* * * * *